US008364115B2

United States Patent
Blair et al.

(10) Patent No.: US 8,364,115 B2
(45) Date of Patent: Jan. 29, 2013

(54) ANONYMOUS HAZARDOUS CONDITION ALERT SYSTEM

(75) Inventors: Robert G. Blair, West Chester, OH (US); Brooks Ryan Fiesinger, West Chester, OH (US); Woodrow Plunkett, Highland Heights, KY (US)

(73) Assignee: Towpal, Inc., West Chester, OH (US)

( * ) Notice: Subject to any disclaimer, the term of this patent is extended or adjusted under 35 U.S.C. 154(b) by 575 days.

(21) Appl. No.: 12/632,009

(22) Filed: Dec. 7, 2009

(65) Prior Publication Data
US 2011/0136464 A1 Jun. 9, 2011

(51) Int. Cl.
*H04M 1/04* (2006.01)
(52) U.S. Cl. .................. 455/404.1; 455/412.2; 455/567
(58) Field of Classification Search .............. 455/404.1, 455/412.1, 567; 340/431, 905
See application file for complete search history.

(56) References Cited

U.S. PATENT DOCUMENTS

| | | | |
|---|---|---|---|
| 4,847,890 A | 7/1989 | Solomon et al. | |
| 4,878,239 A | 10/1989 | Solomon et al. | |
| 5,058,152 A | 10/1991 | Solomon et al. | |
| 5,768,346 A | 6/1998 | Spruijt | |
| 6,055,300 A | 4/2000 | Alton et al. | |
| 6,381,311 B2 | 4/2002 | Joyce et al. | |
| 6,707,889 B1 | 3/2004 | Saylor et al. | |
| 6,711,243 B1 | 3/2004 | Holt | |
| 6,731,725 B1 | 5/2004 | Merwin et al. | |
| 7,046,769 B2 | 5/2006 | Merwin et al. | |
| 7,054,419 B2 | 5/2006 | Culliss | |
| 7,139,552 B1 | 11/2006 | Evans et al. | |
| 7,149,501 B2 | 12/2006 | Haumont et al. | |
| 7,346,150 B2 | 3/2008 | Frifeldt et al. | |
| 2008/0205605 A1* | 8/2008 | Gao et al. ................. | 379/88.22 |
| 2010/0207787 A1* | 8/2010 | Catten et al. ................. | 340/905 |

OTHER PUBLICATIONS

AdTrakker Smart Marketing for Quality Leads website, http://www.adtrakker.net/index.php.
RealtyOne800 website, http://www.realtyone800.com.

* cited by examiner

*Primary Examiner* — Kamran Afshar
*Assistant Examiner* — Manpreet Matharu
(74) *Attorney, Agent, or Firm* — Wood, Herron & Evans LLP

(57) ABSTRACT

An anonymous hazardous condition alert system and process enable individuals to alert property owners of potentially hazardous conditions associated with their property, and in a manner that, if desired, maintains the relative anonymity of both the alerting user and the property owner. An alerting user, upon viewing a hazardous condition, locates a telephone number on a sign disposed proximate to the property in question and calls the telephone number to be connected to a hazardous condition alert system. The system prompts the alerting user to input an identifier that is additionally displayed on the sign and that is associated with the property, and the alerting user is permitted to leave a voice message describing the hazardous condition. Thereafter, the system automatically places a call to a telephone number stored for the property owner and plays the voice message back to the property owner to alert him or her of the hazardous condition.

35 Claims, 21 Drawing Sheets

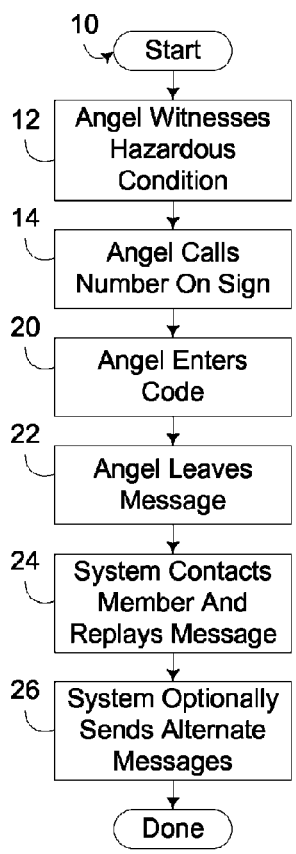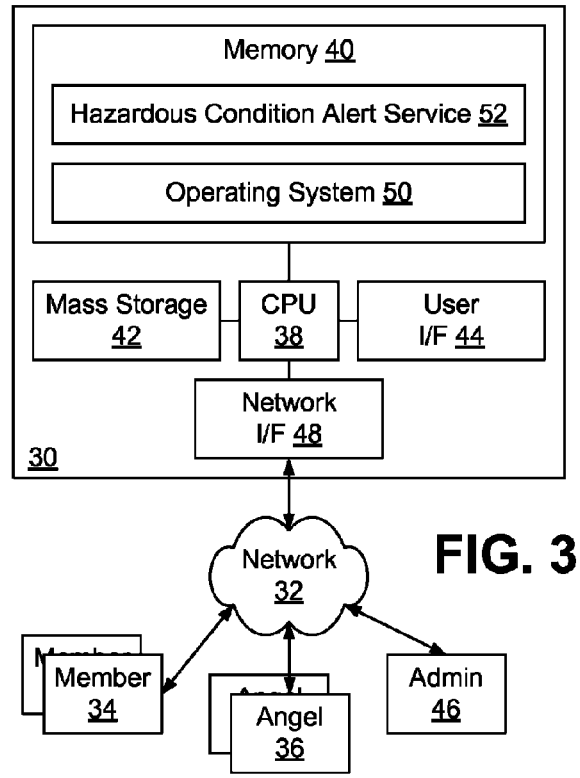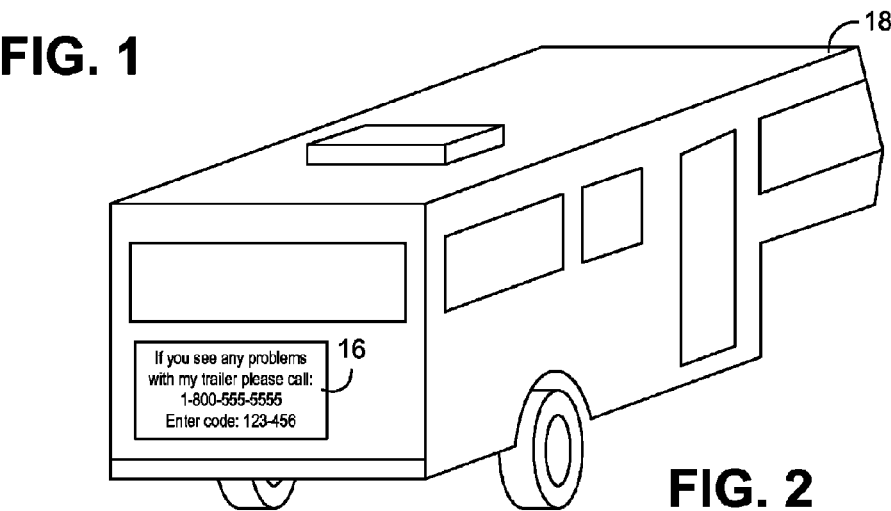
FIG. 1
FIG. 3
FIG. 2

ANONYMOUS HAZARDOUS CONDITION ALERT SYSTEM

FIELD OF THE INVENTION

The invention is generally related to computers, telecommunications and software, and more particularly to alerting property owners of hazardous conditions.

BACKGROUND OF THE INVENTION

Towing a trailer can be a dangerous activity both for the towing individual and individuals in other vehicles. Mechanical issues such as flat tires, non-functioning tail lights, disconnected safety chains, etc. may cause hazardous driving conditions or risk catastrophic equipment failures. Moreover, trailer contents can shift, covers and/or tie downs can become dislodged, doors can become unlatched, etc., potentially resulting in cargo being ejected from a trailer, causing not only property damage but hazardous conditions in the roadway.

Similar issues arise with respect to recreational trailers such as pop-up campers, travel trailers, or fifth wheel trailers, as well as vehicle trailers such as car trailers, boat trailers, motorcycle trailers, personal watercraft trailers, and snowmobile trailers. Other types of cargo carrying trailers, such as horse trailers, semi trailers, flat beds, etc., may also incur substantial risks, as may vehicles towed via tow bars.

Compounding these risks is the fact that in many cases, the hazardous conditions to which a trailer or other towed vehicle may be subjected may not be readily apparent to the driver of the towing vehicle. Often, a towing vehicle has limited sight lines to the towed vehicle, e.g., in the case of a recreational vehicle (RV) towing a car or truck, a truck towing a semi trailer, a truck towing a boat or travel trailer, etc. Even an RV can present a multitude of hazards, such as steps being left down, exterior doors being left unlatched, etc. As a result, an individual may drive for a substantial amount of time unaware of potentially hazardous conditions that, if known earlier, could have been avoided.

Likewise, other personal and real property, when left unattended, may be subjected to hazardous conditions. Docked, moored or stored boats may be damaged by weather or vandalized if left unattended. Vacation homes such as cabins and beachfront property may likewise be damaged by severe weather, or may be broken into or vandalized when an owner is not around. Unattended docks may be damaged due to changes in water level.

In each of the aforementioned examples, however, a potential exists that an individual other than an owner will notice a potentially hazardous condition pertaining to personal or real property. For example, an individual in a car following a truck towing a boat may notice a flat tire or malfunctioning lights, or may notice life vests blowing around in the back of the boat. An individual in a car following an RV towing another car may notice a towbar coming loose. A neighbor may notice that a tree has fallen on a vacation property, or that a water leak is causing flooding in the property.

It can be difficult, however, for an individual noticing a hazardous condition to alert a property owner of the condition. For unattended property such as vacation homes and boats, it may not be easy to find the identity of or contact information for a property owner. Furthermore, in towing or other moving vehicle circumstances, individuals may be reluctant to alert another driver of a hazardous condition over concerns over road rage or mistaken intentions. Furthermore, even if an individual would like to be a Good Samaritan and alert another driver of a hazardous condition, attempting to get the other driver's attention can present additional risks. For example, it can be extremely difficult to get the attention of a driver of a vehicle with limited rear visibility on a two lane road, and some individuals may attempt to make a risky pass in order to get in front of the other driver so that driver can be alerted to the dangerous condition.

A property owner might consider displaying contact information (e.g., a telephone number) on a towed vehicle or other property, such that others could contact the owner in the event of a hazardous condition. Doing so, however, brings with it a host of problems, most notably exposing the owner to harassing calls or enabling others to otherwise misuse their private information.

In a related field, "how's my driving" services exist for many commercial vehicles. A sign or bumper sticker is typically placed on the rear of a delivery van or semi trailer, encouraging others to call a telephone number on the sign or bumper sticker to report instances of bad driving. Callers speak with a customer representative to log their complaints, and the complaints are typically forwarded to management for possible disciplinary action against the driver. However, even if an individual attempted to use such a service to report a dangerous situation, such systems do not provide any way of alerting the driver of the vehicle of that situation.

Therefore, a need continues to exist in the art for a manner of alerting property owners of potentially hazardous conditions associated with their property.

SUMMARY OF THE INVENTION

The invention addresses these and other problems associated with the prior art by providing an anonymous hazardous condition alert system and process that enable individuals to alert property owners of potentially hazardous conditions associated with their property, and in a manner that, if desired, maintains the relative anonymity of both the alerting user and the property owner. In particular, in embodiments consistent with the invention, an automatic and anonymous message push system may be used to forward voice messages recorded by individuals to telephone numbers associated with by property owners, but without the individuals reporting the hazardous conditions ever being provided with the property owners' telephone numbers or other identifying information.

In embodiments consistent with the invention, a first, alerting user, upon viewing a hazardous condition, locates a telephone number on a sign disposed proximate to the property in question and calls the telephone number to be connected to a hazardous condition alert system. The system prompts the first user to input an identifier that is additionally displayed on the sign and that is associated with the property, and the first user is permitted to leave a voice message describing the hazardous condition. Thereafter, the system automatically places a call to a telephone number stored for a second user (the property owner) and plays the voice message back to the second user to alert the second user of the hazardous condition. As such, the second user is immediately notified of the hazardous condition, while neither of the users is provided with the telephone number of the other user, thereby maintaining the relative anonymity of the users.

Consistent on aspect of the invention, for example, a hazardous condition may be reported by, in response to a first telephone call placed to a first telephone number by a first user that has viewed a hazardous condition associated with property of a second user, receiving from the first user during the first telephone call an identifier displayed proximate to the property; using the identifier to retrieve user information associated with the second user from a computer database, where the user information includes a second telephone number associated with the second user; receiving a voice message from the first user during the first telephone call that describes the hazardous condition; electronically storing the voice message; and automatically pushing the electronically stored voice message to the second user by placing a second telephone call to the second telephone number retrieved from the computer database and playing the electronically stored voice message during the second telephone call to alert the second user of the hazardous condition.

Other embodiments consistent with the invention may be utilized in connection with providing technical support for an organization. In response to a first telephone call placed to a first telephone number by a first user that desiring technical support from an organization, a voice message may be received from the first user during the first telephone call that describes an issue for which technical support is needed, the voice message may be electronically stored, and the electronically stored voice message may be automatically pushed to a second, technical support user by placing a second telephone call to a second telephone number associated with the second user and playing the electronically stored voice message during the second telephone call to report the issue to the second user.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a flowchart of an exemplary hazardous condition alert process consistent with the invention.

FIG. 2 is a perspective view of a travel trailer incorporating a sign suitable for use in connection with the hazardous condition alert process of FIG. 1.

FIG. 3 is a block diagram of an exemplary hazardous condition alert system suitable for use in connection with the hazardous condition alert process of FIG. 1.

DETAILED DESCRIPTION

Figure 4A:
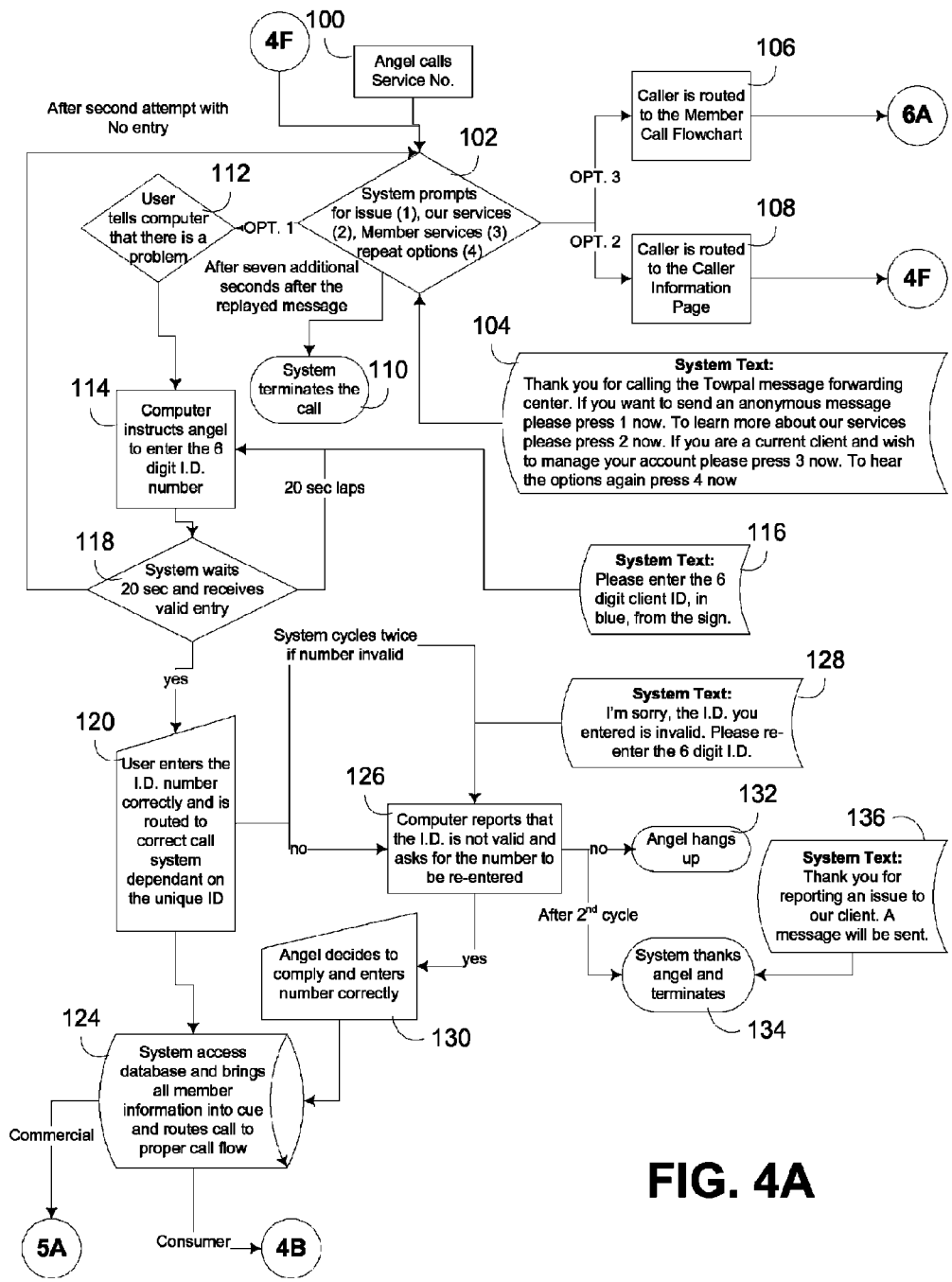
FIGS. 4A-4F illustrate a flowchart showing the sequence of operations performed by the system of FIG. 3 when contacted by an angel user.

Embodiments of the invention provide an anonymous hazardous condition alert system and process that enable individuals to alert property owners of potentially hazardous conditions associated with their property, and in a manner that, if desired, maintains the relative anonymity of both the alerting user and the property owner. An alert system consistent with the invention provides the ability for individuals to be Good Samaritans, or "angels," and alert property owners (also referred to herein as "members") of potentially hazardous conditions associated with their property. It should be appreciated that a "property owner" need not own legal title to the property in question, as the invention may have benefit for alerting any individual who is in possession or control of a particular property at a given time, or who is otherwise able to address hazardous conditions if so alerted.

As will become more apparent below, the invention may be utilized to protect various types of property, including, for example, property involved with towing or travel situations, e.g., cars, trucks, recreational vehicles (RV's), cars, trucks or SUV's in flat tow, boat trailers, travel trailers, fifth wheel trailers, horse trailers, car trailers, semi trailers, flatbed trailers, motorcycle trailers, personal watercraft trailers, snowmobile trailers, etc. The invention may also be utilized to protect unattended property such as vacation homes, cabins, beach property, docks, powerboats, fishing boats, yachts, sailboats, barges, other real estate, parking lots, land, etc.

In addition, the types of hazardous conditions that may be reported will vary depending upon the type of property involved, and may include practically any situation that may arise for which it may be desirable to alert an owner or operator of the property in question. In towing or motor vehicle situations, hazardous conditions may include conditions such as mechanical issues like flat tires, non-functioning tail lights, disconnected safety chains, loose tow bars, unlatched doors, etc., and cargo issues like shifting, instability, loss of cargo, loss of a tarp or cover, loose tie downs, fluids leaking from visible containers or leaking out of enclosed trailers, etc. For other types of property, e.g., unattended real or personal property, hazardous conditions may be associated with weather damage like fallen trees, ice dams, frozen pipes, flooding, etc., mechanical issues like broken windows, insufficient or missing tie downs (e.g., for boats or docks), or criminal issues such as vandalism, burglary, etc. The types of hazardous conditions to which property may be subjected are innumerable and as such the invention is not limited to the particular hazardous conditions disclosed herein.

Now turning to the Drawings, wherein like numbers denote like parts throughout the several views, FIG. 1 illustrates an anonymous hazardous condition alert process 10 consistent with the invention. Process 10 begins in block 12 with a first, alerting user (also referred to herein as an angel) witnessing a hazardous condition. Upon witnessing the hazardous condition, the angel may call a telephone number for a hazardous condition alert system consistent with the invention in block 14.

Typically, the telephone number for the system is disposed proximate to the property in question, e.g., on a sign, bumper sticker, plaque, etc., so that an angel is able to readily determine what number to call in order to report the hazardous condition. For example, FIG. 2 illustrates an exemplary sign 16 affixed to a travel trailer 18, including a telephone number as well as an identifier, such as a numeric code, that is associated with the property and/or with the owner of the property. In addition, the sign 16 may include appropriate instructions for the angel, such as "if you see any problems with my trailer, please call [the listed telephone number] and enter the code [the listed numeric code]." The sign may be of a size and font size so as to be readily visible to an angel, e.g., when the angel is driving behind the trailer. It will be appreciated that any other type of sign or other display (or collection of same) that provides both a manner of contacting the hazardous condition alert system and an identifier associated with the property and/or its owner, may be used in the alternative.

Returning to FIG. 1, once the angel calls the telephone number and is connected to the hazardous condition alert system, the angel is prompted to enter the identifier, e.g., a numeric code, that is associated with the property in block 20. The angel is then permitted to leave a voice message in block 22, and thereafter, the system automatically pushes the voice message to a second, member user (the property owner) by placing a call to a telephone number stored for the member user and playing the voice message back to the member user in block 24 to alert the member user of the hazardous condition. In the illustrated embodiment, the forwarding of the voice message to the member user occurs in an automatic fashion, and without human intervention, to ensure that the voice message is delivered as quickly as possible in the event that a hazardous condition requires immediate attention. The system thus operates in many respects as an anonymous answering messaging service with automatic push notification of messages.

Typically, and particularly in the event of vehicle-related hazardous conditions, both the angel and the member will connect with the hazardous condition alert system via mobile phones, and as such, the system will call a mobile phone number for the member in response to a report from an angel. However, in some instances, land line phones may be used, so the invention is not limited to use with mobile phones.

In addition, as illustrated in block 26 (which is optional), a hazardous condition alert system consistent with the invention may, in addition to calling a telephone number for a member, also send alternate types of messages to the member to ensure that the member receives the alert as quickly as possible. As will be discussed in greater detail below, a member may store more than one telephone number in the system and have the system simultaneously or sequentially call the various telephone numbers to attempt to reach the member. In addition, other types of non-voice messages, e.g., text/SMS messages, emails, etc., which are sent over a medium other than a telephone call, may also be sent to a member in response to an alert. Voice-to-text processing may also be used to convert a voice message into a textual format. In addition, while the illustrated embodiment relies principally on an angel generating a voice message via a telephone call to the system, a system consistent with the invention may also receive alerts via other mechanisms in addition to telephone calls, e.g., via emails, text messages, etc. In addition, a telephone call may be considered to include various types of voice communications, whether communicated in whole or in part via cellular networks, VOIP, PSTN, the Internet, etc.

As such, by virtue of process 10, a member is quickly notified of a hazardous condition. Furthermore, neither the angel, nor the member, is provided with the telephone number of the other, thereby maintaining the relative anonymity between the two individuals. From the perspective of the member, no identifying information regarding the member, other than the identifier displayed on the sign, is known to others, as the telephone number on the sign is a general number associated with the system. Furthermore, the angel is desirably not required to provide any identifying information in the voice message or otherwise, and can remain completely anonymous if they so desire. As will become more apparent below, in some embodiments it may be desirable to store caller ID information for an angel; however, it may be desirable to inhibit a member from obtaining the caller ID information, or in other embodiments, to not store any caller ID information in response to an angel call.

Now turning to FIG. 3, as noted above, one or more steps in process 10 may be implemented in an automated fashion, utilizing a computer or other electronic device to implement such steps. FIG. 3, for example, illustrates an exemplary apparatus 30 within which various steps from process 10 may be implemented in a manner consistent with the invention. Apparatus 30 in the illustrated embodiment is implemented as a server or multi-user computer that is coupled via a telecommunications network 32 to one or more members 34 and angels 36. For the purposes of the invention, computer 30 may represent practically any type of computer, computer system or other programmable electronic device. Moreover, computer 30 may be implemented using one or more networked computers, e.g., in a cluster or other distributed computing system.

Computer 30 typically includes a central processing unit 38 including at least one microprocessor coupled to a memory 40, which may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 40 may be considered to include memory storage physically located elsewhere in computer 30, e.g., any cache memory in a processor in CPU 38, as well as any storage capacity used as a virtual memory, e.g., as stored on a mass storage device 42 or on another computer coupled to computer 30. Computer 30 also typically receives a number of inputs and outputs for communicating information externally. For interface with a user or operator, computer 30 typically includes a user interface 44 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., by an administrator 48.

For additional storage, computer 30 may also include one or more mass storage devices 42, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface 48 with one or more networks 32 (e.g., a LAN, a WAN, a wireless network, a telephone network and/or the Internet, among others) to permit the communication of information with other computers and electronic devices. It should be appreciated that computer 30 typically includes suitable analog and/or digital interfaces between CPU 36 and each of components 40, 42, 44 and 48 as is well known in the art. Other hardware environments are contemplated within the context of the invention.

Computer 30 operates under the control of an operating system 50 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 30 via network 32, e.g., in a distributed or client-server computing environment, whereby the processing required to implement the functions of a computer program may be allocated to multiple computers over a network.

As an example, computer 50 may include a hazardous condition alert service 52 used to implement one or more of the steps described above in connection with process 10. It will be appreciated, however, that some steps in process 10 may be performed manually and with or without the use of computer 30. Service 52 is accessible via members 34, angels 36 and an administrator 46, typically via a number of different manners. For example, in the illustrated embodiment, service 52 communicates with members 34 and angels 36 primarily over a telecommunications network using an automated and interactive voice system. In addition, members 34 may additionally communicate with service 52 via a web-based system, e.g., to create and manage member accounts. Other combinations of networks and communication protocols, e.g., email, SMS messaging, etc. may be used in lieu of or in addition to voice and web-based communications in other embodiments consistent with the invention.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, tangible storage media such as volatile and non-volatile memory devices, floppy and other removable disks, hard disk drives, magnetic tape, optical disks (e.g., CD-ROMs, DVDs, etc.), among others, and transmission media such as digital and analog communication links.

In addition, various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

As noted above, in the illustrated embodiment, interaction between the hazardous condition alert system and users such as angels and members is primarily handled via an automated and interactive voice communications system. FIGS. 4A-4F, 5A-5B, 6A-6L and 7-8, for example, illustrate an implementation of the invention within an interactive voice communications system, where users call a central telephone number of interact with the system via a combination of prompts, key presses and/or voice responses. Such systems typically operate through the use of automated scripts, and it will be appreciated that generation of appropriate scripts from the flowcharts illustrated in the aforementioned figures would be within the abilities of one of ordinary skill in the art having the benefit of the instant disclosure. The automated scripts disclosed in this implementation refer in some instances to specific time periods (e.g., seven days); however, it will be appreciated that other time periods may be used, and that such time periods may be customizable in some implementations.

FIGS. 4A-4F, for example, illustrate the operations that may occur in response to an angel calling the system via a main (service) number, such as is displayed on member signs, as shown at 100 in FIG. 4A. The angel is prompted at block 102 with an initial script as shown at block 104, with options to report an issue, to receive information on the system services, to receive member services, and to repeat the options. As shown in block 106, if the caller selects the member services option, control passes to a member services process, discussed below starting with FIG. 6A. As shown in block 108, if the caller selects the caller information option, control is passed to a caller information process, discussed below in connection with FIG. 4F. If the caller selects the repeat option, the message is repeated, and if no response is received within seven seconds, the system terminates the call (block 110).

If, however, the caller selects to report an issuer (block 112), control passes to block 114 to prompt the caller (an angel) to enter a six digit code associated with the property in question, and displayed on the sign, using the text shown in block 116. The system waits in block 118 to receive a valid entry. If no entry is received in 20 seconds, control returns to block 114, and if no response is received after a second attempt, block 118 returns control to block 102.

If a valid entry is received (block 120), control passes to block 124 to retrieve the member's information for the member associated with the entry and route the call to either a consumer or a commercial sub-system, the former of which is detailed below in connection with FIG. 4B, and the latter of which is detailed below in connection with FIG. 5A. Returning to block 118, if an invalid code is entered, the system cycles twice, prompting the caller in block 126 with the text in block 128. If the caller enters a valid code, block 130 passes control to block 124 to route the call to the appropriate subsystem. Otherwise, after two unsuccessful attempts, the angel either hangs up (block 132) or the system thanks the angel and terminates the call in block 134 using the text from block 136.

Figure 4B:
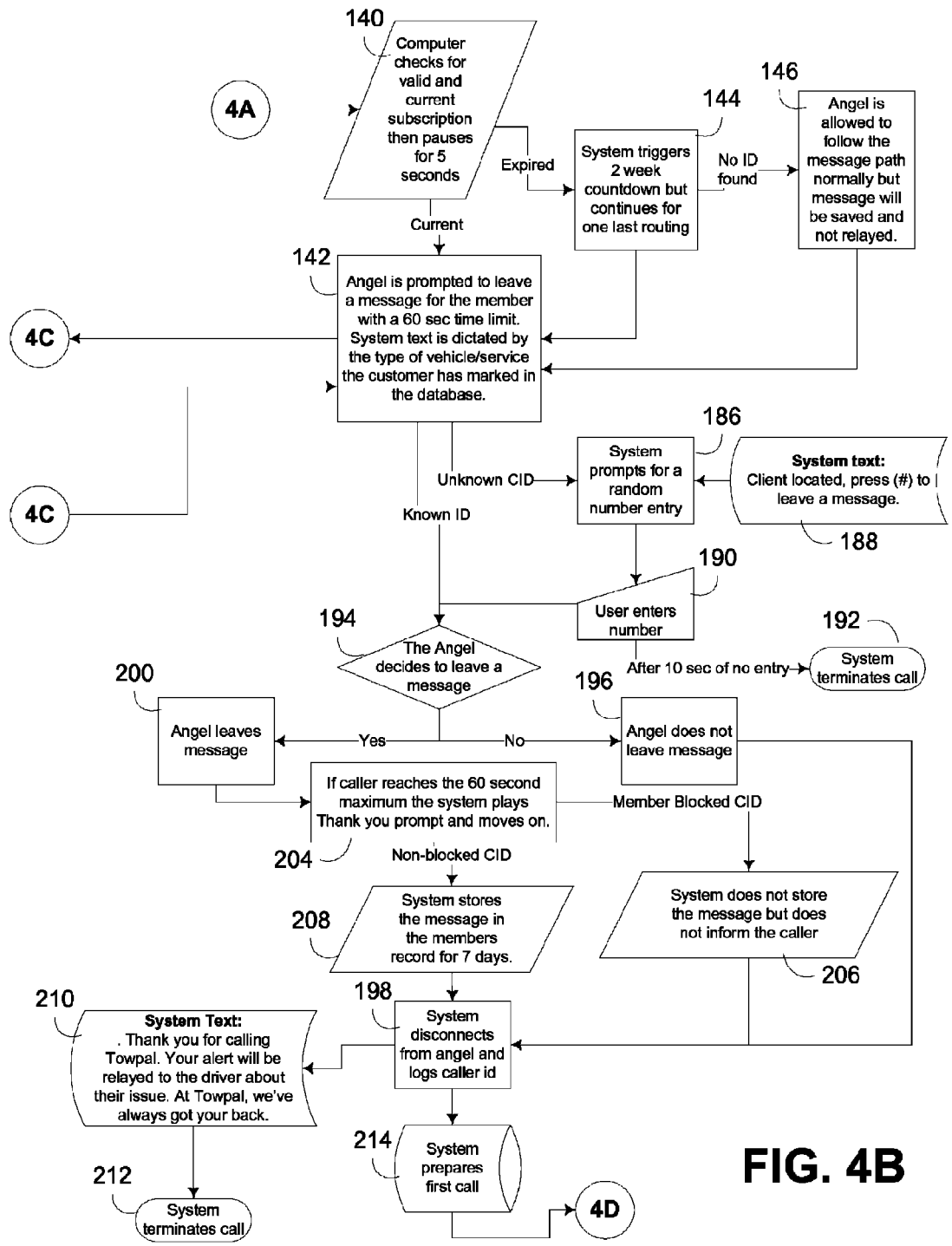

FIG. 4B illustrates the operation of the consumer subsystem in greater detail. Once a call is routed to this subsystem, control passes to block 140 to check for a valid and current subscription for the member associated with the code input by the angel. If the code is valid and current, control passes to block 142 to prompt the angel to leave a 60 second message for the member. Returning to block 140, if the member's subscription is expired, control passes to block 144 to trigger a two week countdown, before passing control to block 142. If the entered code is not valid, block 140 passes control to block 146 to allow the angel to leave a message but not save or forward the message.

Figure 4C:
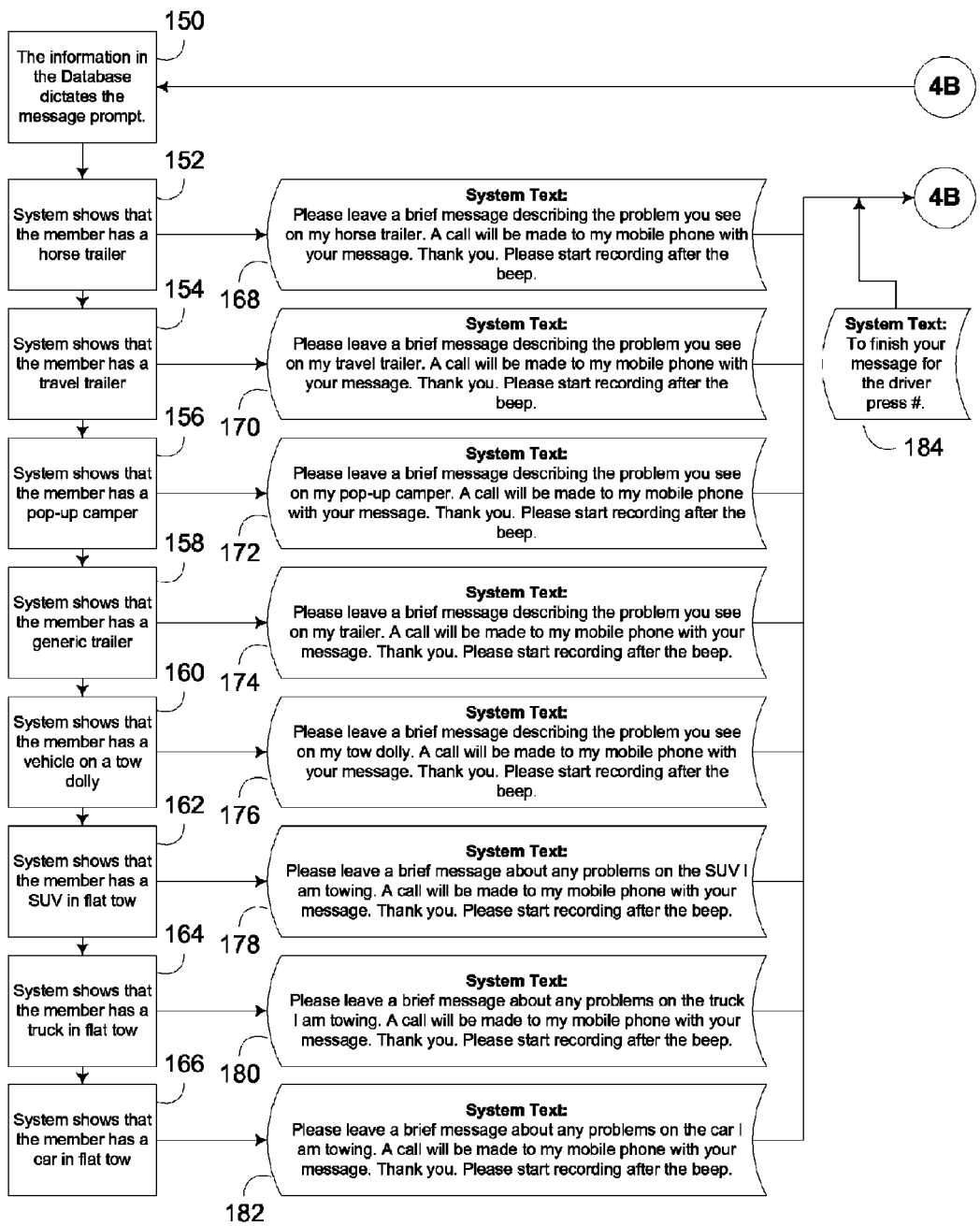

The text of the prompt is desirably specific to the type of property with which the code is associated, e.g., a horse trailer, a travel trailer, a pop-up camper, a standard trailer, a tow dolly, an SUV being towed, a truck being towed, and a car being towed. As shown in FIG. 4C, for example, the system accesses a database in block 150 to determine the type of property associated with the number, and then passes control to one of blocks 152-166, and playing the corresponding message from one of blocks 168-182, and playing in all instances the message shown in block 184. It will be appreciated that the types of text that may be displayed will vary depending upon the different types of property supported, and that provisions may be made in the system to update this text should property types be added or removed.

Returning to FIG. 4B, once the caller has been prompted to leave a voice message, if the caller ID of the caller is unknown or blocked, the system prompts the caller for a random number entry in block 186, using the prompt in block 188. The caller enters the number in block 190, and if no entry is made in 10 seconds, the system terminates the call (block 192). Otherwise, based upon whether the caller opts to leave a message (block 194), if the caller does not leave a message (block 196), the system disconnects from the angel and logs the caller ID of the angel (block 198).

If, on the other hand, the caller leaves a message, control passes to block 200 to leave the message. As shown in block 204, if the caller reaches the maximum 60 second duration, the system plays a thank you prompt.

If the caller ID for the caller is blocked by the member (e.g., if the member has chosen to block the angel's calls based upon past messages from the angel, control passes to block 206, which bypasses storing of the message, but without alerting the angel that their caller ID has been blocked. Control then passes to block 198 to terminate the call. On the other hand, if the caller ID is not blocked, control passes to block 208 to store the message in the member's database record for a fixed duration (e.g., seven days), thereafter passing control to block 198. Upon disconnecting from the angel in block 198, a message such as illustrated in block 210 may be played to the angel, prior to terminating the call in block 212.

Figure 4D:
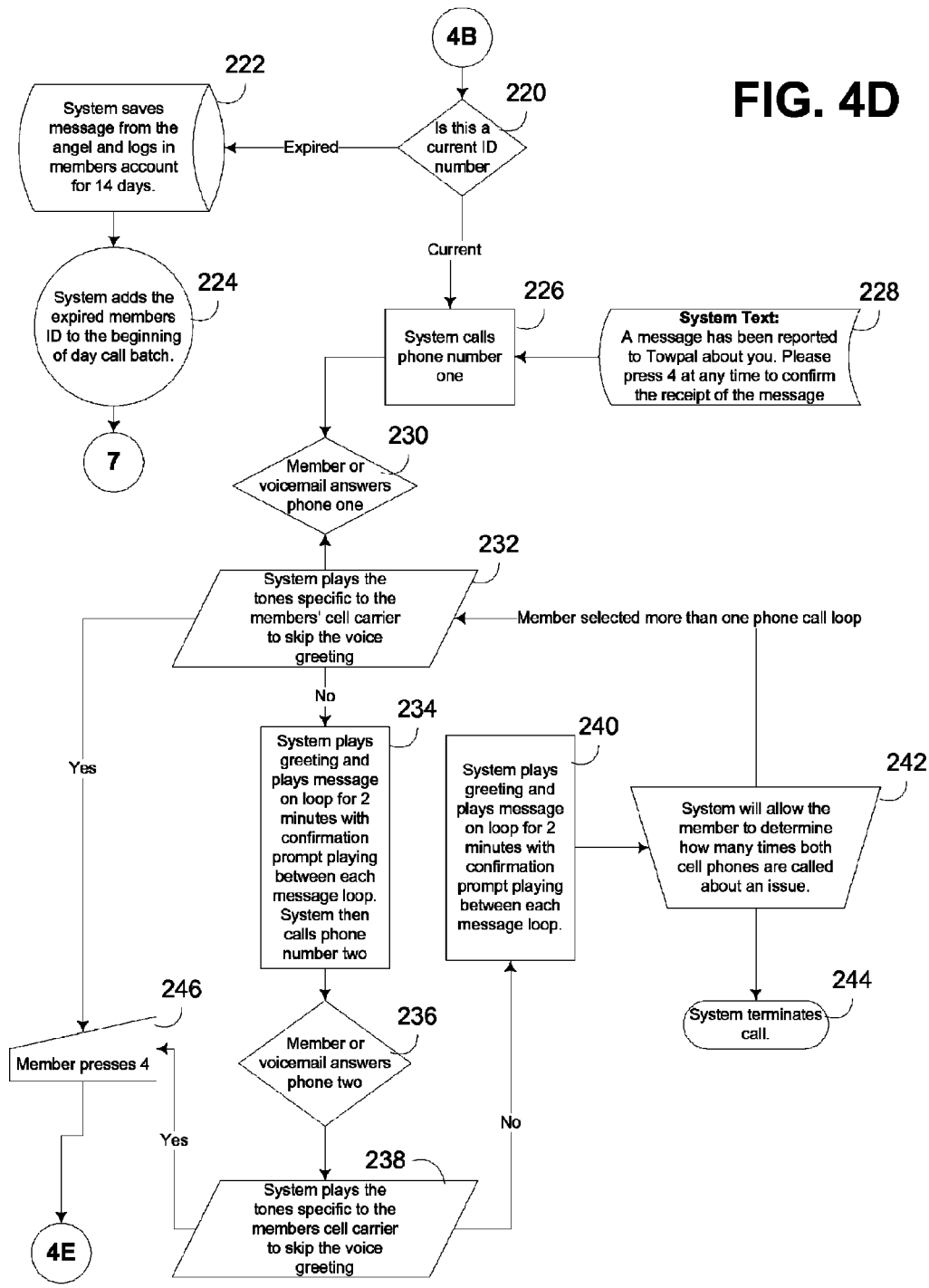
Figure 4E:
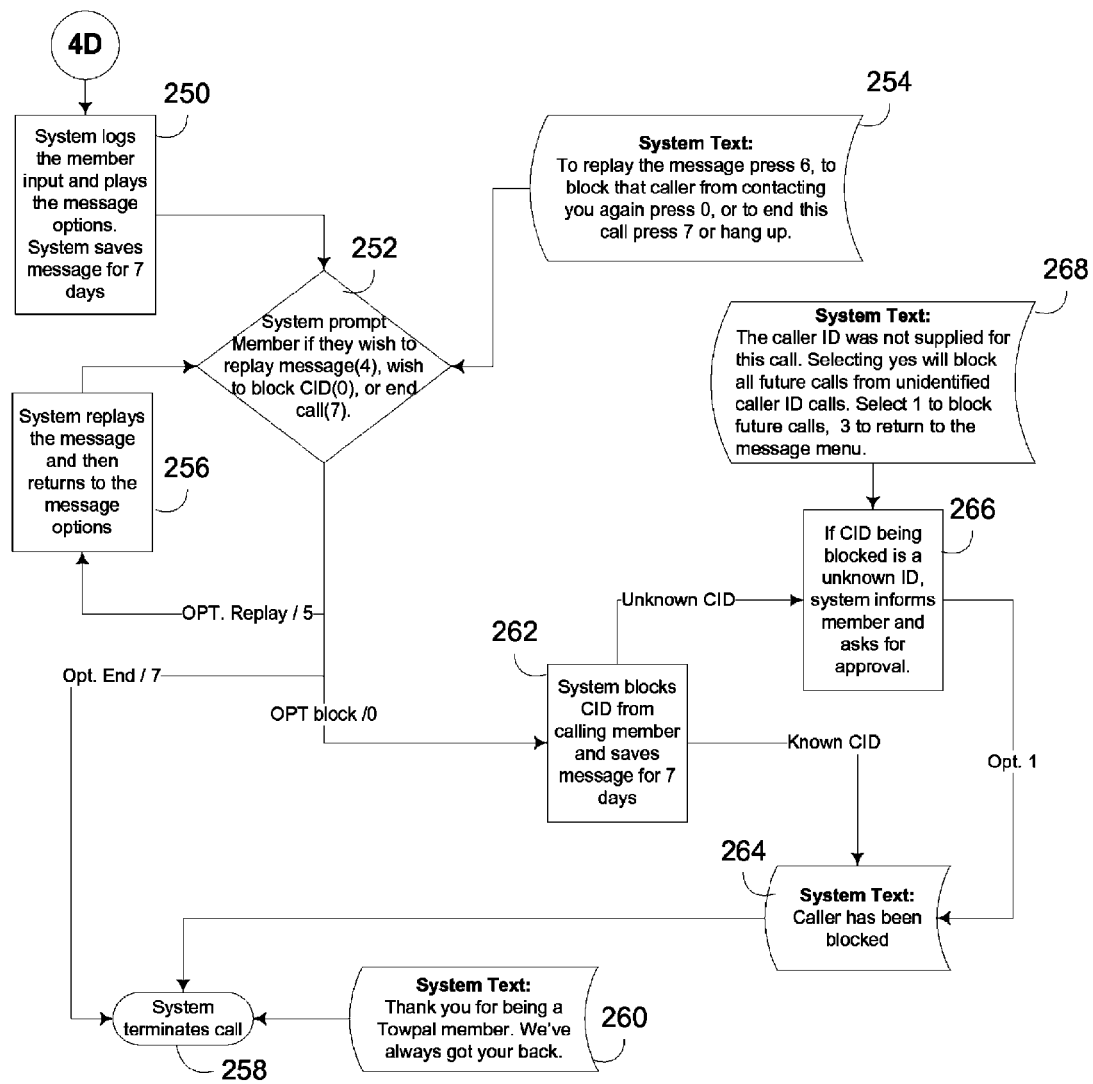

Returning to block 198, in addition to terminating the call, the system proceeds in block 214 to prepare the first call to the member. As shown in FIG. 4D, the system determines whether the member associated with the entered code has a current or expired subscription (block 220). If expired, control passes to block 222 to save the message from the angel and the associated logs in the member's account for a fixed duration (e.g., 14 days). The system then adds the member's identification to the beginning of a day call batch (block 224), which is used to periodically call an expiring member's telephone number to alert them of their expired subscription (described in greater detail below in connection with FIG. 7).

If the membership is current, control passes to block 226 to call the first phone number stored in the database record for the member, playing a prompt such as shown in block 228 to prompt the member to confirm receipt of the message. In general, the system will attempt to call one or more telephone numbers associated with a member two in the illustrated embodiment), optionally more than once, until the system receives a confirmation from the member that the message has been received. Each time the system reaches voicemail, the system also loops the recorded message so that the member will receive a copy of the message if the member does not personally answer the message. It will be appreciated that a member may provide any number of telephone numbers to try, and that the member may select how many times each number is called. A system consistent with the invention may also call the numbers sequentially or concurrently in different embodiments. In addition, a member may be contacted repeatedly until a confirmation is received in some embodiments.

Thus, once the member or voice mail answers the initial call (block 230), the system plays a carrier specific set of tones to disable the voice greeting in the event that voice mail or the member, second user, picks up the call (block 232). Alternatively, if no cell carrier is specified in a member's database record, a generic three tone sequence is played. In other embodiments, no tones may be played. Then, as long as the confirmation has not yet been received from the member, the system plays the recorded message on a loop for 2 minutes (block 234), with the confirmation prompt playing between each message loop. The system then calls the second phone number stored for the member (if any), and when the member of his or her voice mail picks up the call (block 236) the system plays the carrier-specific tones to disable the voice mail greeting (block 238), then plays a greeting and the recorded message on a 2 minute loop, with a confirmation playing between each message loop (block 240). The system enables a member to select how many times the two telephone numbers will be called about an issue (block 242), so if the member has elected to call the member's telephone numbers more than once, control returns to block 232 to recall the first number. Otherwise, the system terminates the call (block 244).

Once a member confirms receipt of the message in a call to either of the two numbers (block 246), control passes to block 250 (FIG. 4E), where the system logs the member input and plays the message options, saving the message for a fixed duration (e.g., seven days). The system prompts the member in block 252, playing the prompt text shown in block 254, and enabling the member to replay the message, block future calls from this angel (using the caller ID information for angel's call) or end the call. If the member selects the replay option, control passes to block 256 to replay the message and return to block 252. If the end the call option is selected, the system terminates the call (block 258), playing a thank you message (block 260) prior to termination. If the block option is selected, control passes to block 262, where the system blocks the caller ID from the angel (calling member) and saves the message for seven days. If the caller ID information for the call was known, the system alerts the member that the caller has been blocked (block 264). However, if the caller ID information is unknown, control passes to block 266 to ask the member whether the member would like to block all future calls from angel's for which the caller ID information is not available (e.g., if they block their caller ID's), using the text shown in block 268. If the member elects to block all unknown callers, control passes to block 264, which then terminates the call by passing control to block 258.

Figure 4F:
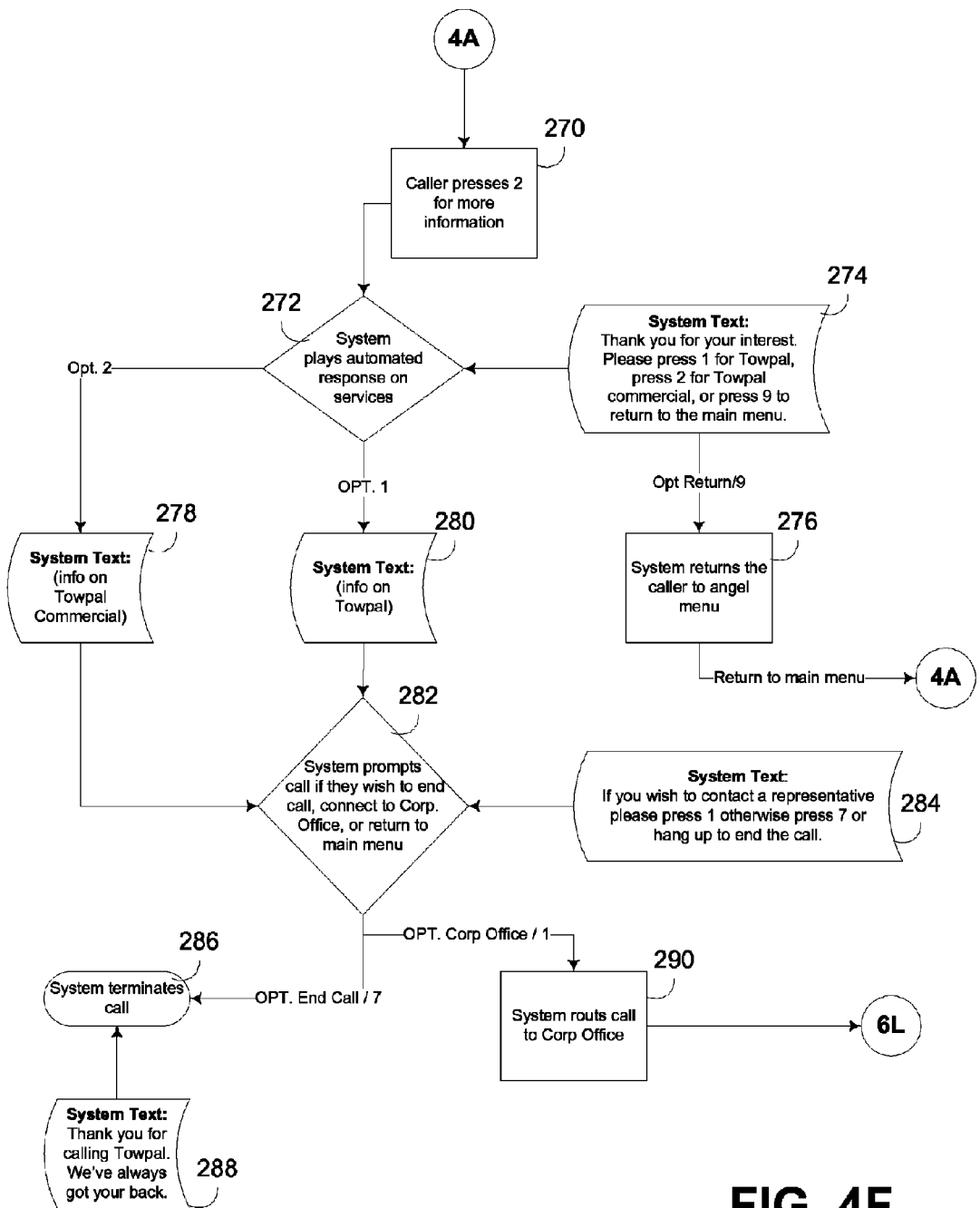

FIG. 4F next illustrates the caller information flow, entered in response to a request for more information in block 102 of FIG. 4A. When a caller requests more information (block 270), the system prompts the caller in block 272 using the text in block 274. In response to selecting a return to main menu option, control passes to block 276 to return control to block 102 of FIG. 4A. In response to selecting a commercial account option, control passes to block 278 to play back information regarding a commercial account, and in response to selecting a consumer account, control passes to block 280 to play back information regarding a consumer account. After playing back the requested information, blocks 278 and 280 each pass control to block 282 to prompt the caller to terminate the call, return to main menu or go to a corporate office, using the text from block 284. A request to end the call passes control to block 286 to terminate the call after playing back the message in block 288. A request to route the call to the corporate office passes control to block 290, which transfers control the flow illustrated in FIG. 6L below.

Figure 5A:
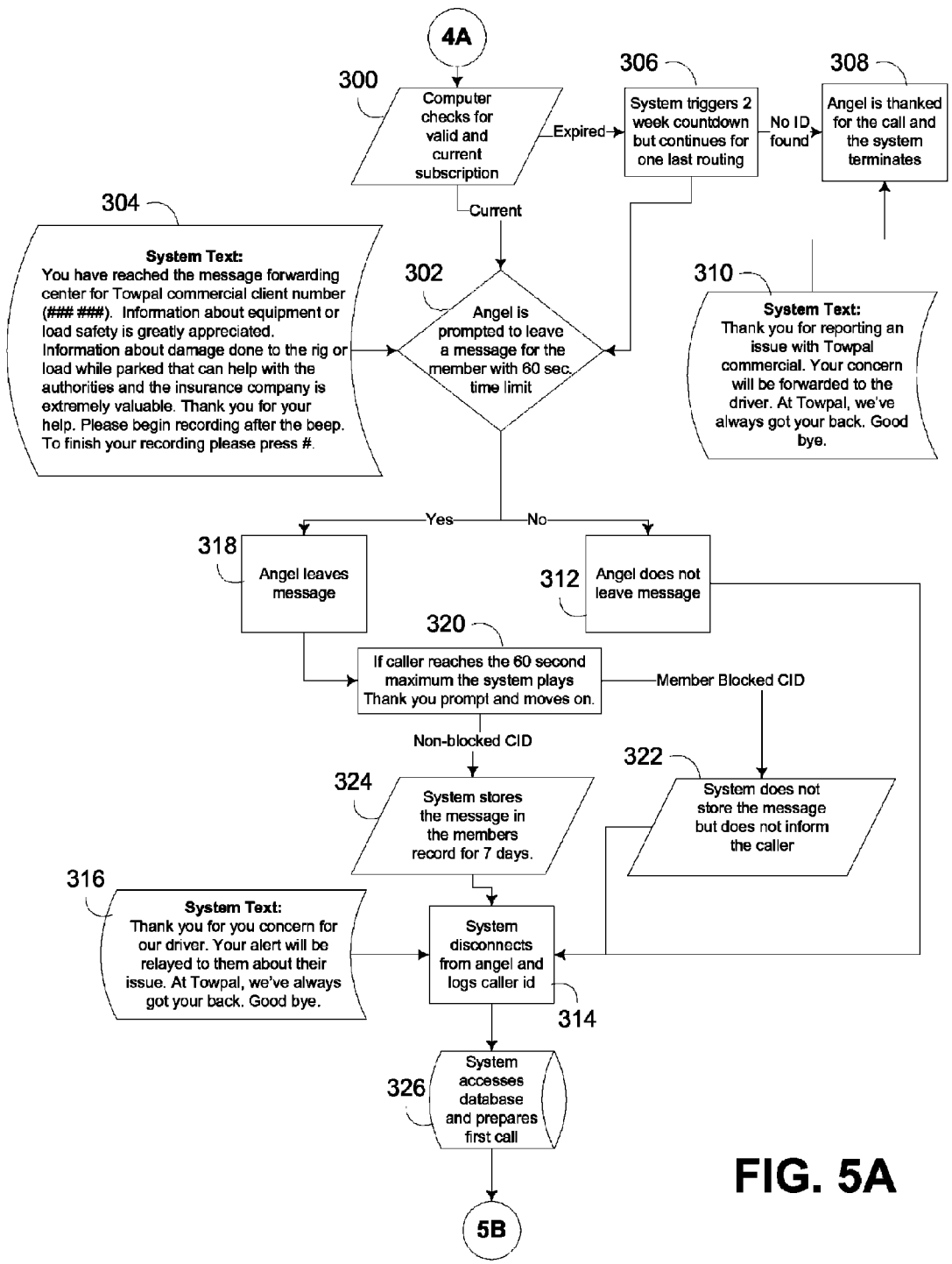
FIGS. 5A-5B illustrate a flowchart showing the sequence of operations performed by the system of FIG. 3 when contacted by an angel user to report a hazardous condition associated with a commercial member user.

FIG. 5A illustrates the operation of the commercial sub-system in greater detail (called by block 124 of FIG. 4A). Once a call is routed to this sub-system, control passes to block 300 to check for a valid and current subscription for the member associated with the code input by the angel. If the code is valid and current, control passes to block 302 to prompt the angel to leave a 60 second message for the member, using the prompt shown in block 304. Returning to block 300, if the member's subscription is expired, control passes to block 306 to trigger a two week countdown, before passing control to block 302. If the entered code is not valid, block 300 passes control to block 308 to allow the angel to leave a message but not save or forward the message, using the prompt shown in block 310.

Returning to block 302, once the caller has been prompted to leave a voice message, if the caller does not leave a message (block 312), the system disconnects from the angel and logs the caller ID of the angel (block 314), playing back the text in block 316. If, on the other hand, the caller leaves a message, control passes to block 318 to leave the message. As shown in block 320, if the caller reaches the maximum 60 second duration, the system plays a thank you prompt.

If the caller ID for the caller is blocked by the member (e.g., if the member has chosen to block the angel's calls based upon past messages from the angel, control passes to block 322, which bypasses storing of the message, but without alerting the angel that their caller ID has been blocked. Control then passes to block 314 to terminate the call. On the other hand, if the caller ID is not blocked, control passes to block 324 to store the message in the member's database record for a fixed duration (e.g., seven days), thereafter passing control to block 314.

Figure 5B:
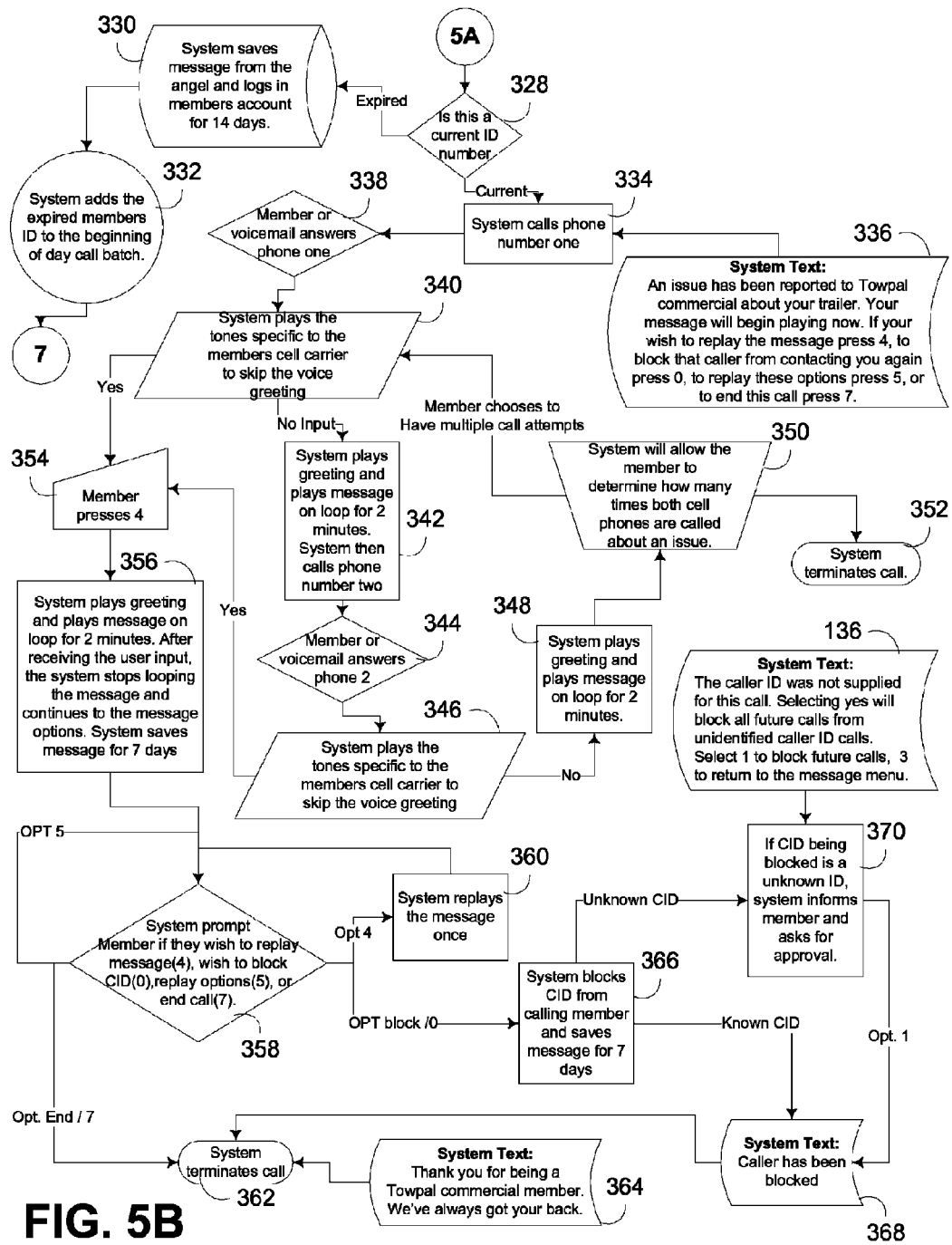

Returning to block 314, in addition to terminating the call, the system proceeds in block 326 to prepare the first call to the member. As shown in FIG. 5B, the system determines whether the member associated with the entered code has a current or expired subscription (block 328). If expired, control passes to block 330 to save the message from the angel and the associated logs in the member's account for a fixed duration (e.g., 14 days). The system then adds the member's identification to the beginning of a day call batch (block 332), which is used to periodically call an expiring member's telephone number to alert them of their expired subscription (described in greater detail below in connection with FIG. 7).

If the membership is current, control passes to block 334 to call the first phone number stored in the database record for the member, playing a prompt such as shown in block 336 to prompt the member to confirm receipt of the message. Once the member or voice mail answers the initial call (block 338), the system plays a carrier specific set of tones to disable the voice greeting (block 340). Then, as long as the confirmation has not yet been received from the member, the system plays the recorded message on a loop for 2 minutes (block 342), with the confirmation prompt playing between each message loop. The system then calls the second phone number stored for the member (if any), and when the member of his or her voice mail picks up the call (block 344) the system plays the carrier-specific tones to disable the voice mail greeting (block 346), then plays a greeting and the recorded message on a 2 minute loop, with a confirmation playing between each message loop (block 348). The system enables a member to select how many times the two telephone numbers will be called about an issue (block 350), so if the member has elected to call the member's telephone numbers more than once, control returns to block 340 to recall the first number. Otherwise, the system terminates the call (block 352).

Once a member confirms receipt of the message in a call to either of the two numbers (block 354), control passes to block 356, where the system logs the member input and plays the message options, saving the message for a fixed duration (e.g., seven days). The system prompts the member in block 358, enabling the member to replay the message, replay options, block future calls from this angel (using the caller ID information for angel's call) or end the call. If the member selects the replay message option, control passes to block 360 to replay the message and return to block 358. If the end the call option is selected, the system terminates the call (block 362), playing a thank you message (block 364) prior to termination. If the block option is selected, control passes to block 366, where the system blocks the caller ID from the angel (calling member) and saves the message for seven days. If the caller ID information for the call was known, the system alerts the member that the caller has been blocked (block 368). However, if the caller ID information is unknown, control passes to block 370 to ask the member whether the member would like to block all future calls from angels for which the caller ID information is not available (e.g., if they block their caller ID's). If the member elects to block all unknown callers, control passes to block 368, which then terminates the call by passing control to block 362.

Figure 6A:
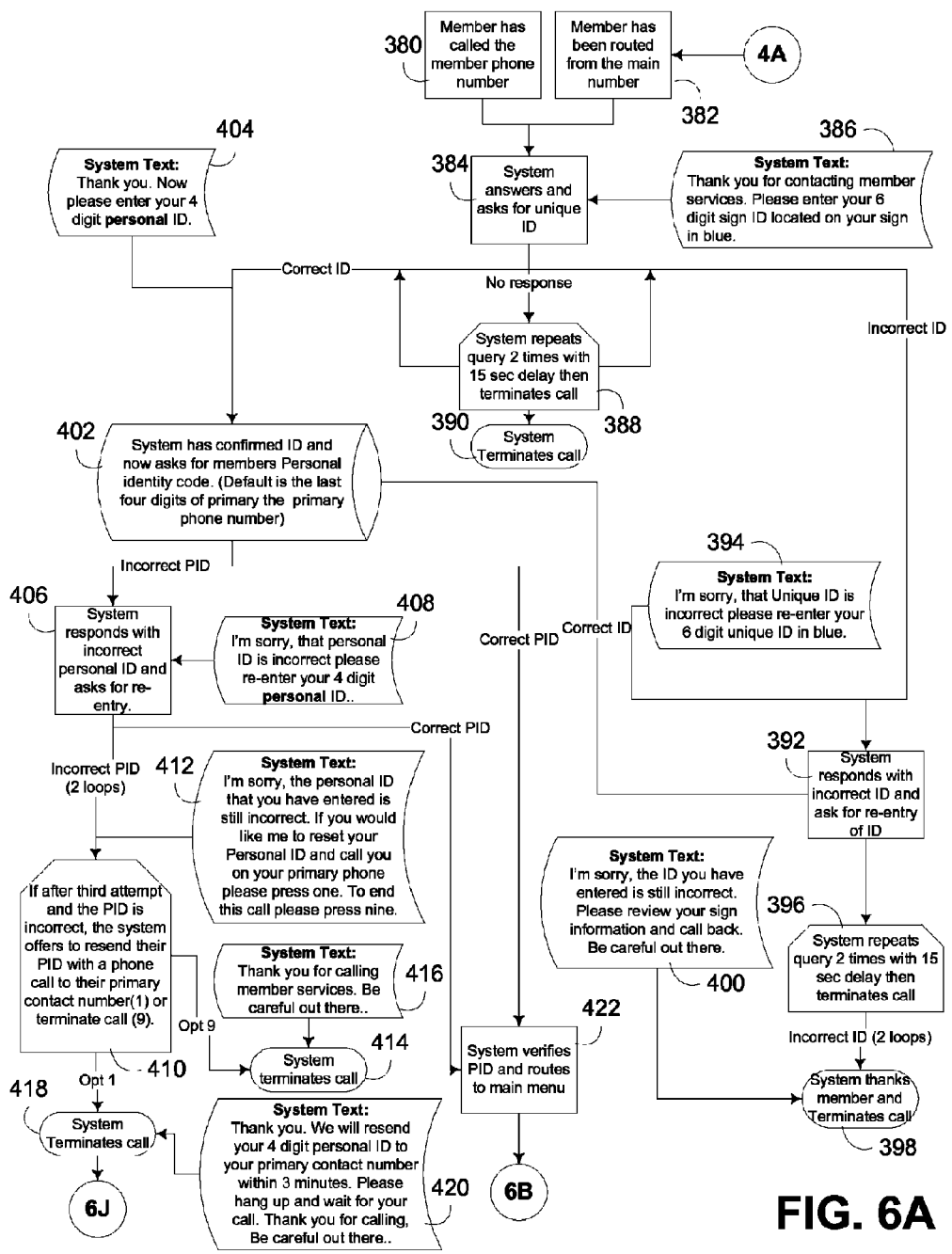
FIGS. 6A-6L illustrate a flowchart showing the sequence of operations performed by the system of FIG. 3 when contacted by a member user.

FIG. 6A next illustrates a member call flow, initiated either in response to a member call to a member telephone number (block 380) or after being routed from the main telephone number (block 382) from block 106 of FIG. 4A. In either case, control passes to block 384 to prompt the caller to enter a member identifier, e.g., the numeric code from the member's sign, using the prompt in block 386. If no response is received after two queries (block 388) the call is terminated in block 390. If an identifier is received, the identifier is checked against the database for a matching member record associated with the identifier. If an incorrect identifier is entered (block 392), prompting the caller with the text in block 394. The system then repeats the query up to two times in block 396, terminating the call if no correct identifier is received (block 398), and informing the caller using the text in block 400.

If a correct identifier is entered, the system then prompts the member to enter a personal identifier (PID) in block 402, using the text in block 404. If an incorrect PID is entered (block 406), the system asks for reentry using the text from block 408, and if an incorrect PID is entered twice, control passes to block 410 to offer the member to resend their PID to their primary contact number, using the text in block 412. If the caller elects to end the call, control passes to block 414 to terminate the call, playing the message in block 416. If the caller elects to have their PID resent to their contact number, control passes to block 418 to terminate the call and play back the message from block 420. Control then passes to the resend PID flow illustrated in FIG. 6J (discussed supra).

Figure 6B:
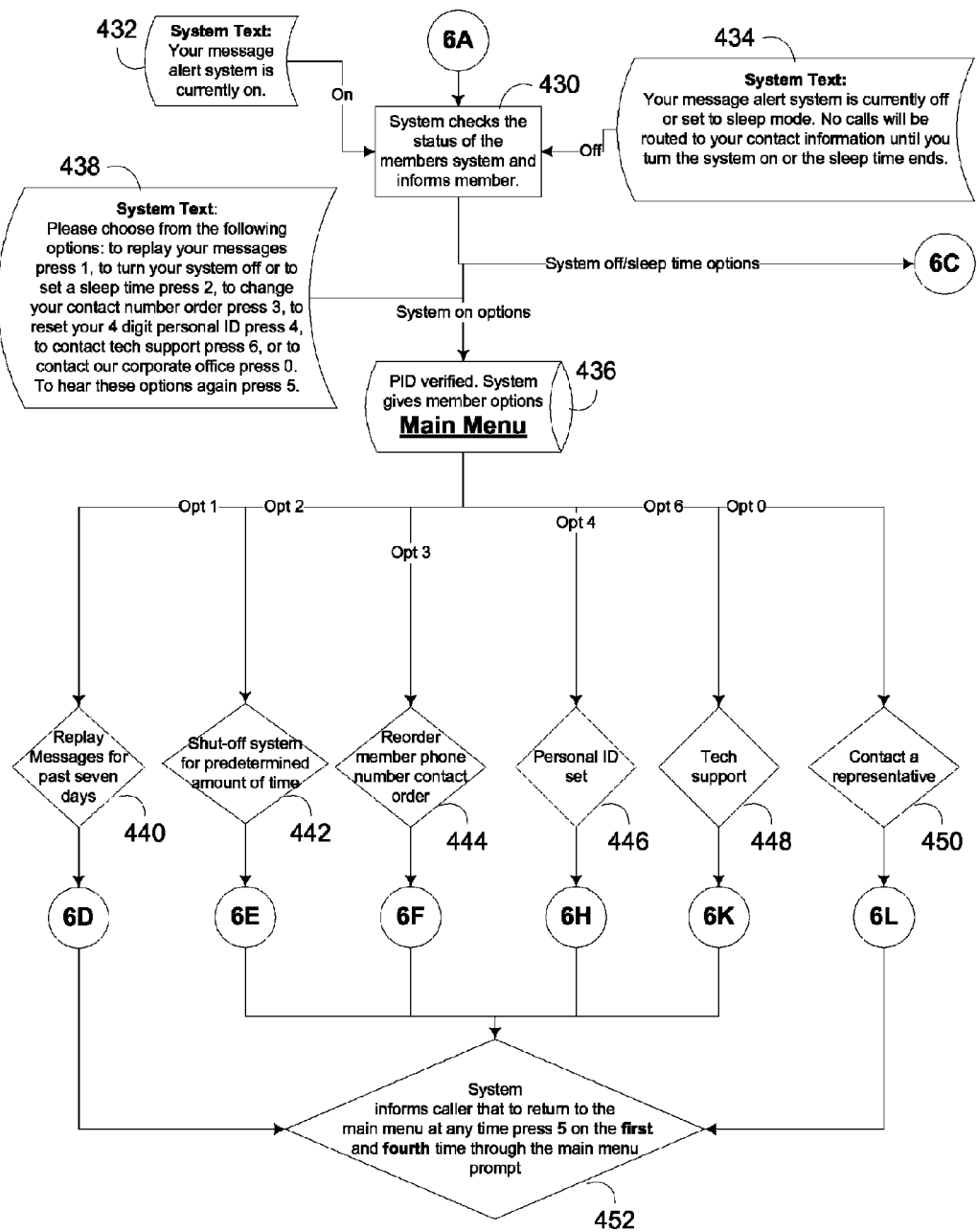
Figure 6C:
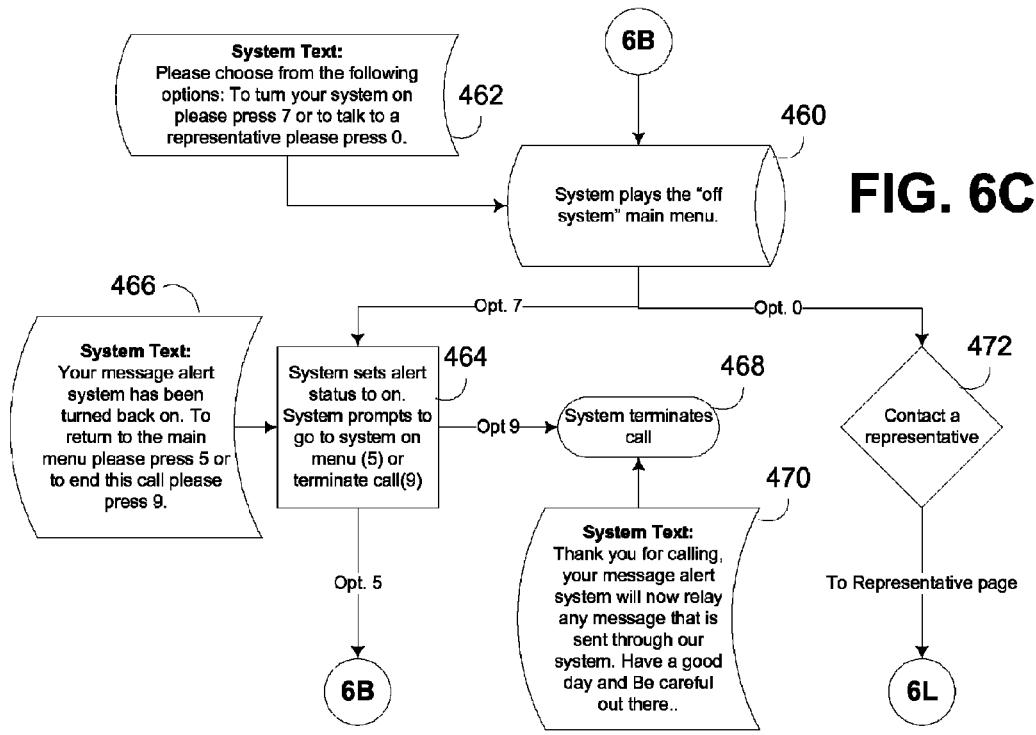

Returning to block 406, once a correct PID is entered, control passes to block 422 to route the caller to the main menu, illustrated in FIG. 6B. The system first checks in block 430 whether the member's system is currently on or off. If on, the member is prompted using the text in block 432, and if off, the member is prompted using the text in block 434.

If on, the member is then presented with "on" menu options in block 436 with the text in block 438. In response to selecting a replay messages for last seven days option (block 440), the member is routed to the flow illustrated in FIG. 6D. In response to selecting a shut off system option (block 442), the member is routed to the flow illustrated in FIG. 6E. In response to selecting reorder member contact information option (block 444), the member is routed to the flow illustrated in FIG. 6F. In response to selecting a reset PID option (block 446), the member is routed to the flow illustrated in FIG. 6H. In response to selecting a contact tech support option (block 448), the member is routed to the flow illustrated in FIG. 6K. In response to selecting a contact corporate office option (block 450), the member is routed to the flow illustrated in FIG. 6L. In addition, the system informs the member in block 452 that the member has the option of returning to the main menu at any time.

Returning to block 430, if the system is off, control passes to block 460 of FIG. 4C to present the member with an alternate "off" main menu, playing the prompt shown in block 462. If the member requests to turn the system on (block 464), the system turns the member's alert system on, playing the prompt from block 466. The member can then elect to return to the "on" main menu (block 436 of FIG. 6B) or terminate the call (block 468), being prompted in the latter instance using the text of block 470. Returning to block 460, the member can also elect to contact a representative (block 472), passing control to the corporate office flow of FIG. 6L.

Figure 6G:
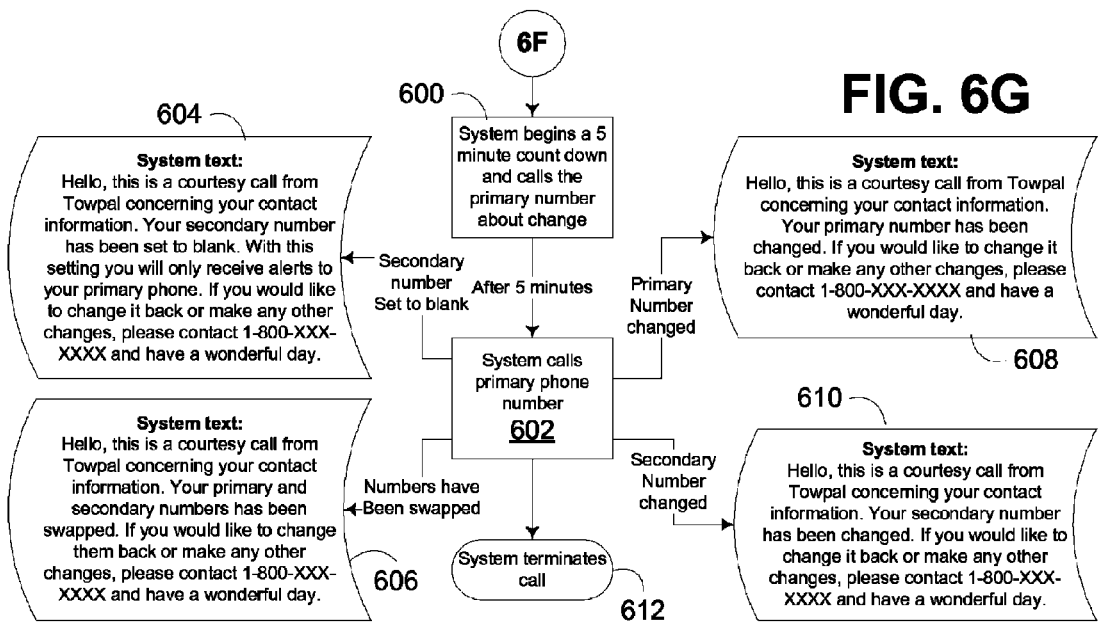
Figure 6D:
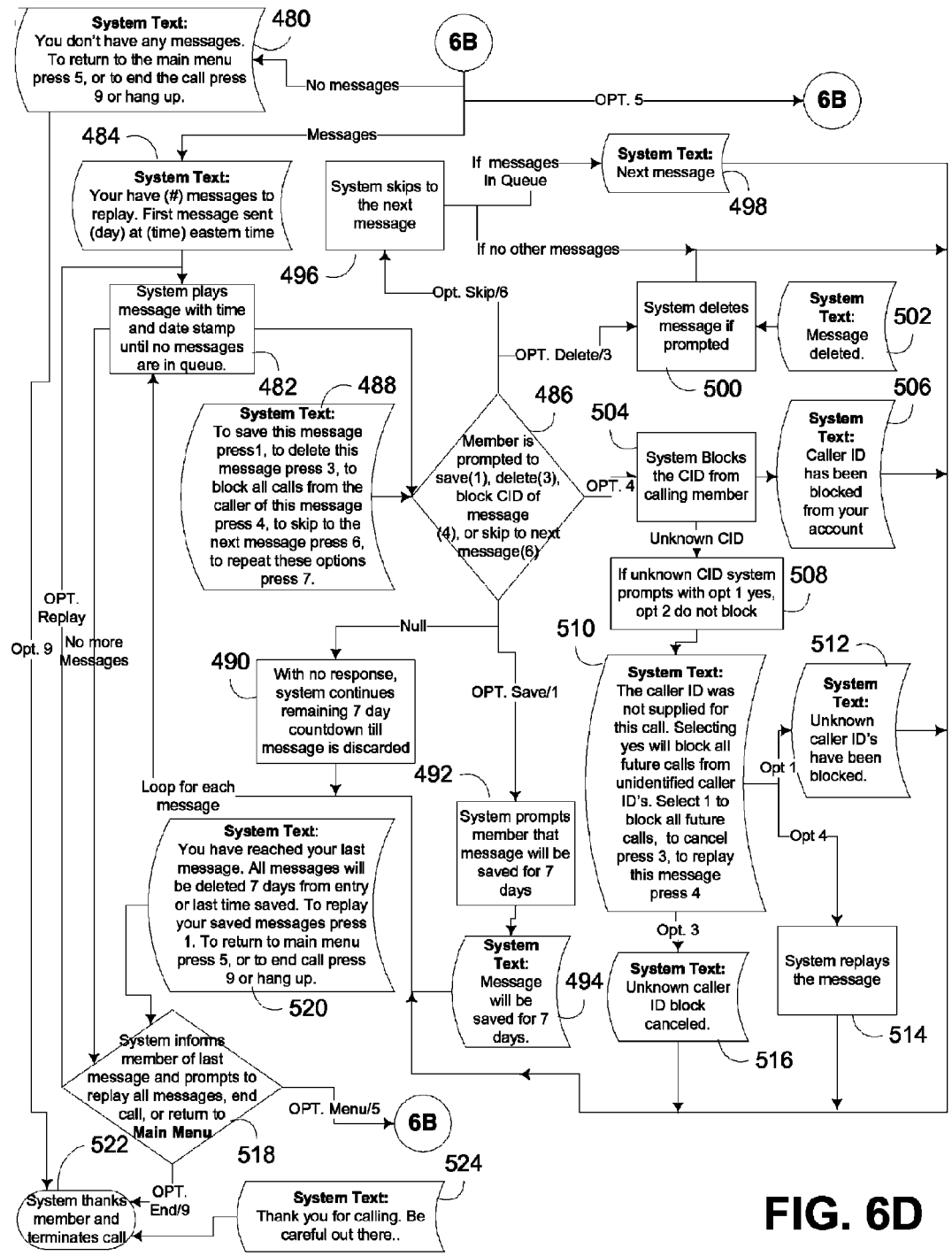

Next turning to FIG. 6D, if a member requests to replay messages from the main menu, if there are no pending messages, the text of block 480 is played to the member, giving the member the option of returning to the main menu or terminating the call. If messages are pending, control passes to block 482 to play back the first message with its time and date stamp, using the text of block 484. Control then passes to block 486 to prompt the member using the text of block 488. If no response is received, control passes to block 490 to continue to count down the period until the message is discarded, and control then passes to block 482 to play the next message. If the member selects the save option, control passes to block 492 to save the message, prompting the member with the text in block 494, then passing control to block 482 to play additional messages. If the member selects a skip option, control passes to block 496 to skip to the next message. If no unplayed messages are pending, control passes to block 482, but if additional messages are pending, the member is prompted with a "next message" prompt (block 498) before returning control to block 482. If a delete message option is selected, block 486 passes control to block 500 to delete the message, prompting the user with the text in block 502, and returning control to block 482.

If a block caller option is selected, block 486 passes control to block 504 to block the caller ID from the message. If the caller ID is known, the caller ID is blocked, and the member prompted with the text of block 506 before returning control to block 482. If the caller ID is unknown however control passes to block 508 to prompt the member with the text in block 510, and giving the member the option of blocking all calls from unknown caller ID's. If the member elects to block all unknown calls, the user is prompted at block 512 and control returns to block 482. If the member elects to replay the message, control passes to block 514 to replay the message and return to block 482. If the member cancels the operation, control passes to block 516 to cancel the operation and return control to block 482.

Block 482 plays back each unplayed message until no messages remain. Once there are no unplayed messages, control passes to block 518 to prompt the member to replay messages, end the call or return to the main menu, playing the text at block 520. If the member elects to replay messages, control returns to block 482. If the member elects to return to the main menu, control returns to block 436 of FIG. 6B. If the member elects to terminate the call, control passes to block 522 to terminate the call and play back the message in block 524.

Figure 6E:
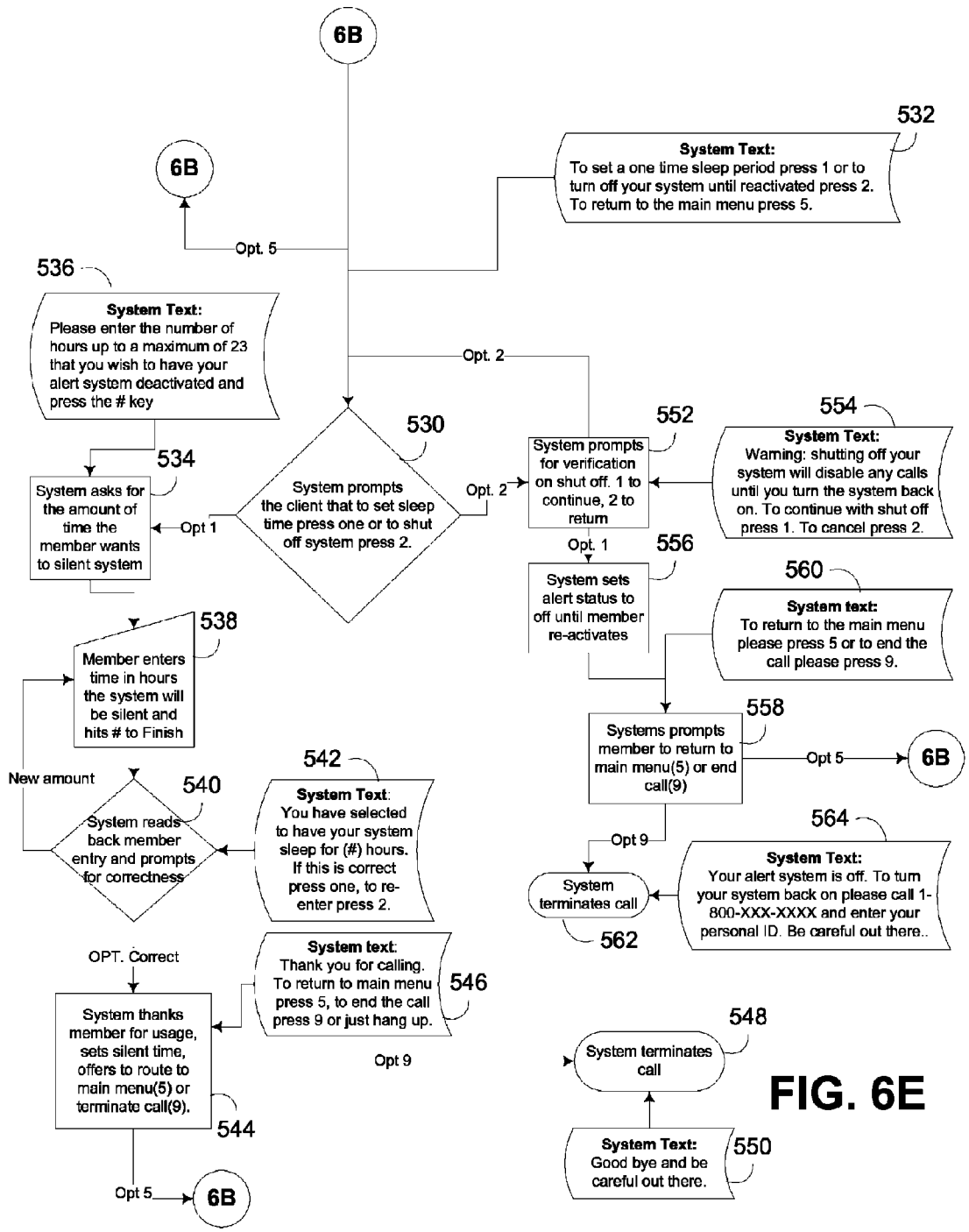

FIG. 6E next illustrates the shut off option flow, which may be used to temporarily shut off the automatic pushing of alerts to the member, i.e., to disable notification of the member such that the automatic push of a voice message left by an angel will be deferred or delayed until notifications have been reenabled for the member. In the illustrated embodiment, a member can disable notifications for an unspecified period of time (i.e., until the member reenables notifications), or can disable notifications for a period of time specified by the member (e.g., for a selected number of hours, referred to as a "sleep" period). As such, prior to automatically pushing voice messages to members, the system will first determine whether notifications have been disabled prior to automatically pushing any voice messages to any member. In addition, the system automatically reenables notifications for the member after expiration of the sleep period.

The shut off option flow begins in block 530 by playing the message in block 532 giving the member the option of shutting off the system until reactivated or for a selected period of time (i.e., a sleep option). If the sleep option is selected, control passes to block 534 to play the message in block 536 and ask for the amount of time the member wants to put the system to sleep, up to 23 hours. The member enters the time in hours in block 538, and the system plays back the selected time in block 540, using the message in block 542. If the member does not confirm the number, control returns to block 538, otherwise, control passes to block 544 to play the message in block 546 and give the member the option of returning to the main menu or terminating the call. If the former, control returns to the main menu, and if the latter, control passes to block 548 to play the message from block 550 and terminate the call.

Returning to block 530, if the member elects to turn the system off, control passes to block 552 to prompt the member to verify the shut off, using the message in block 554. If confirmed, the system is shut off in block 556, and the system prompts the member in block 558 to return to the main menu or end the call, playing the message from block 560. If the former, control returns to the main menu, and if the latter, control passes to block 562 to play the message from block 564 and terminate the call.

Figure 6F:
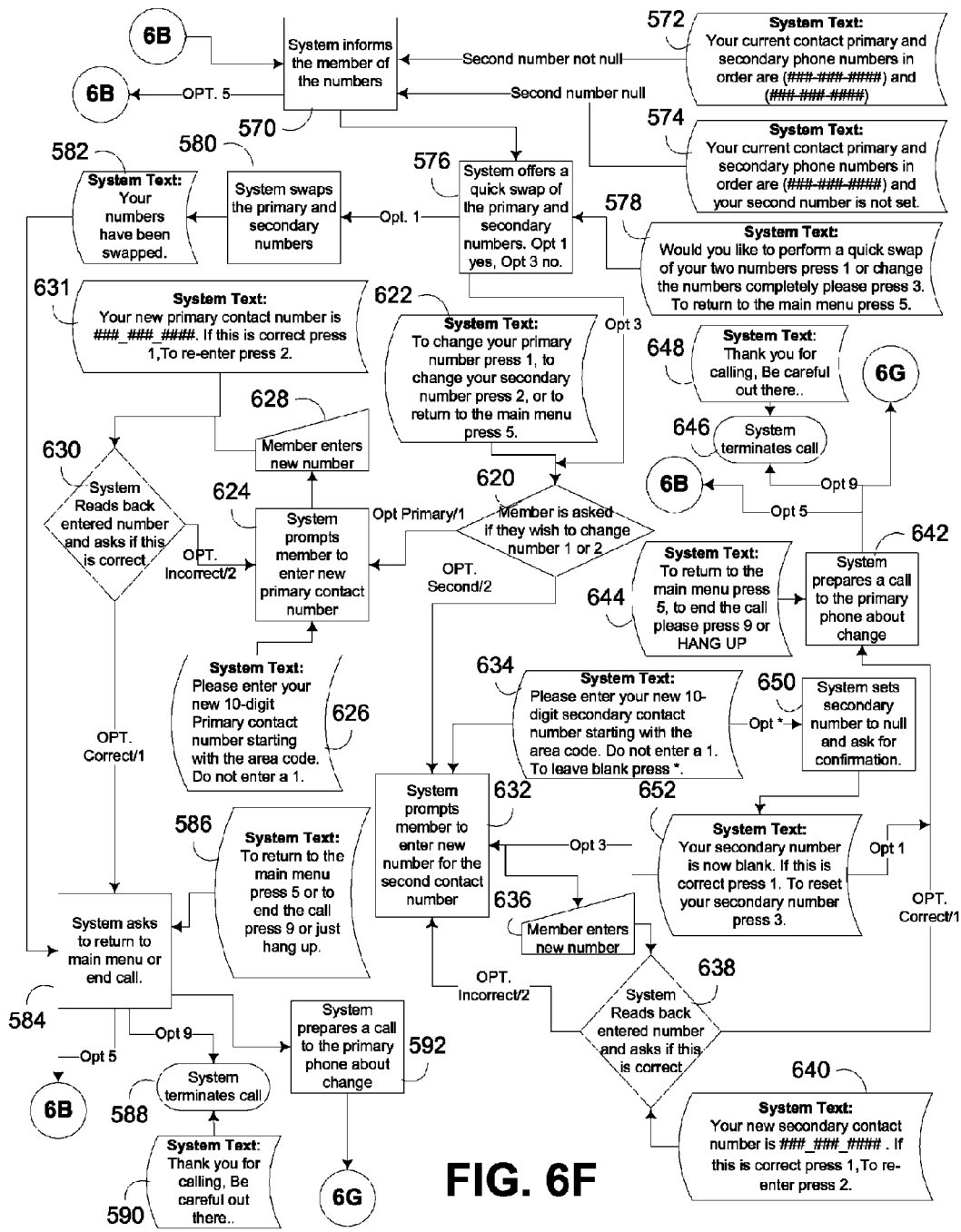

FIG. 6F illustrates a reorder member contact information flow, selected from the main menu of FIG. 6B. In block 570 the system informs the member of the member's current contact telephone numbers, playing the prompt in block 572 if the secondary telephone number is not null, and playing the prompt in block 574 if the secondary telephone number is set to null. The system offers to swap the primary and secondary numbers in block 576, playing the message in block 578. If the member elects to swap the telephone numbers, control passes to block 580 to swap the primary and secondary numbers, playing the message in block 582. Control then passes to block 584 to prompt the member to return to the main menu or end the call, using the message of block 586. The member may elect to return to the main menu or terminate the call, in the latter case passing control to block 588 to terminate the call and play the message in block 590. Also, in some embodiments, it may be desirable to reset the PID automatically to a default PID (e.g., the last 4 digits of the primary telephone number) when the telephone numbers are changed, and as such, it may be desirable to alert a member of this reset prior to terminating the call.

In addition, as shown in block 592, the system prepares a call to the primary telephone number to alert the member of the change. As shown in FIG. 6G, the system starts a five minute count down before calling the member in block 600. After the delay, block 602 calls the primary telephone number for the member and plays back one of the messages in blocks 604-610 based upon what has been changed by the member: secondary number set to null (block 604), numbers being swapped (block 606), primary number changed (block 608) or secondary number changed (block 610). After playing the automated message to the member, the call is terminated in block 612.

Returning to FIG. 6F, and in particular block 576, if the member does not perform a quick swap, control passes to block 620 to play the message in block 622 to give the member to the option of changing the primary number, changing the secondary number, or returning to the main menu. If the member elects to change the primary number, control passes to block 624 to play the message in block 626 and ask the user to enter a new primary number. The member enters the number in block 628, and the system plays the number back in block 630, using the text in block 631. If the member confirms the number is correct, control passes to block 584. If the number is incorrect, however, control returns to block 624.

Returning to block 620, if the member elects to change the secondary number, control passes to block 632 to play a message in block 634, prompting the member to enter a new number or press "*" to set the number to null. The member enters the number in block 636, and the system reads back the number in block 638, playing the prompt in block 640. If confirmed by the member, control passes to block 642 to prepare a call to the primary number about the change, playing the prompt in block 644. The member can either return to the main menu or terminate the call, the latter of which passes control to block 646 and plays the message in block 648.

Returning to block 632, if the member elects to null the secondary number, control passes to block 650 to set the secondary number to null, and prompting the member with the message in block 652. Control then passes to block 642 or to block 632, depending upon the member's response.

Figure 6H:
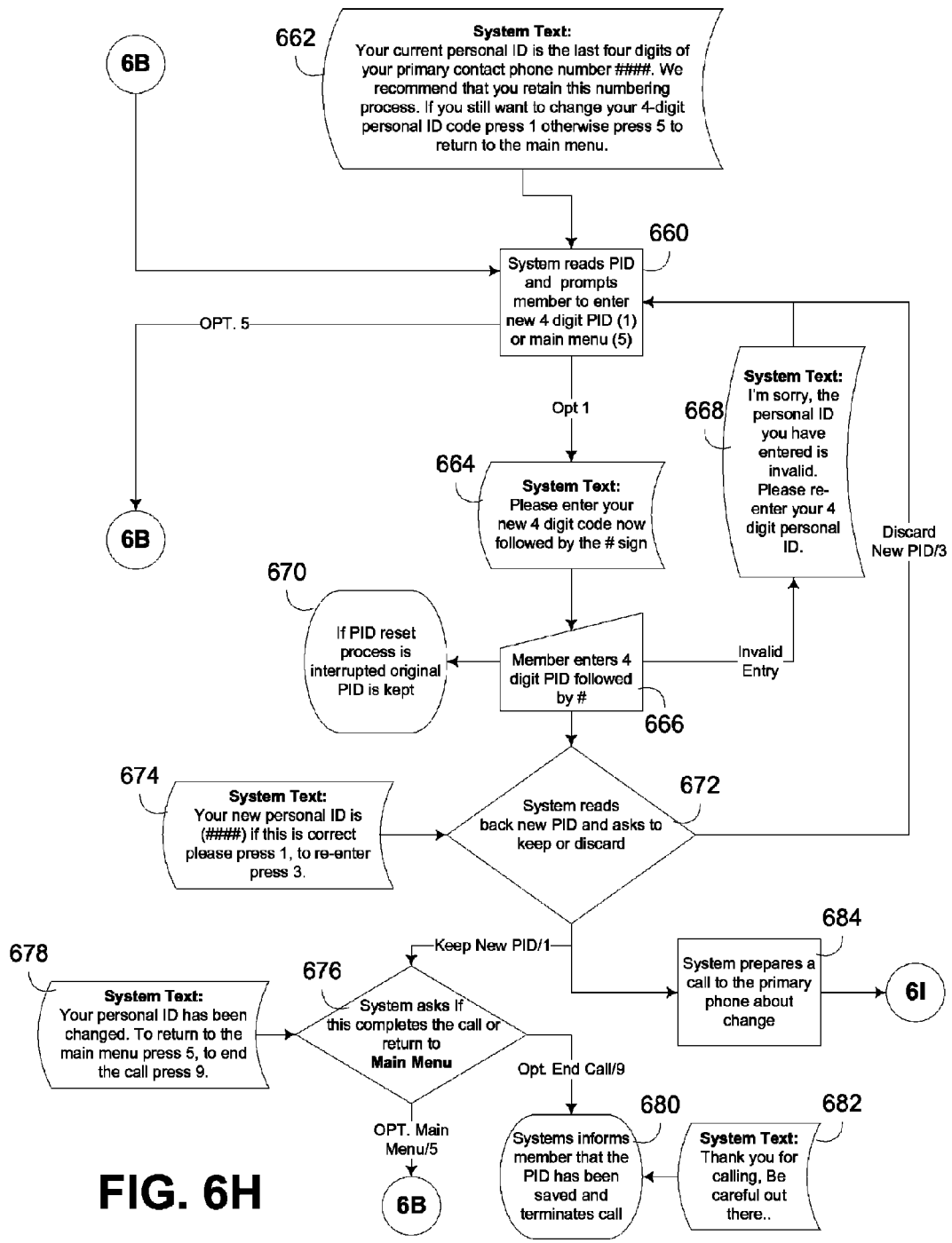

FIG. 6H illustrates a set PID flow, which begins in block 660 by playing the message in block 662, which informs the member of their current PID and gives them the option to change it. The member can either return to the main menu or change the PID. If the latter is selected, control passes to block 664 to prompt the member to enter a new PID (e.g., a 4 digit code, which may default to the last four digits of the member's primary contact number). The member enters the new PID in block 666, and if an invalid entry, control passes to block 668 to play a message to that effect and return control to block 660. As noted in block 670, if the PID reset process is interrupted at any point, the original PID is maintained.

If a correct PID is entered, control passes to block 672 to read back the new PID and ask the member whether to keep or discard, playing the prompt in block 674. If the member elects to discard, control returns to block 660, otherwise, control passes to block 676 to play the message in block 678 and give the member the option of returning to the main menu or terminating the call. If the latter, control passes to block 680 to inform the member that the PID has been saved via the message in block 682, and terminate the call. In addition, returning to block 672, after a valid PID is entered, control passes to block 684 to initiate a call to the member's primary number to alert them to the PID change.

Figure 6I:
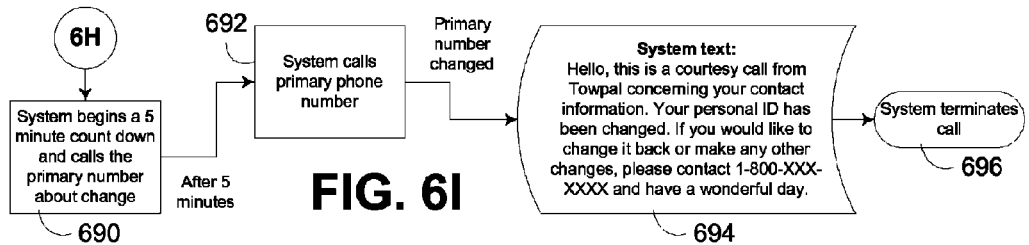

This call is illustrated in greater detail in FIG. 6I, in which the system begins a five minute count down in block 690 and calls the member's primary number after expiration of the count down in block 692. The system plays the message in block 694 and then terminates the call in block 696.

Figure 6J:
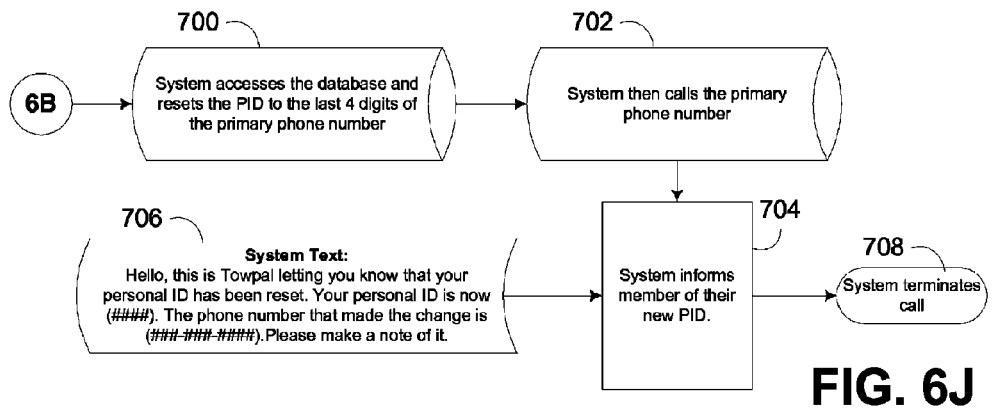

FIG. 6J next illustrates the resend of a member's PID, initiated in response to a member incorrectly entering their PID three times, and initiated by block 410 of FIG. 6A. In block 700, the system accesses the database for the member's record and resets the PID to the last four digits of the member's primary telephone number. Next, the system calls the primary phone number in block 702 and informs the member of the new, reset PID in block 704, playing the message in block 706. The system then terminates the call in block 708.

Figure 6L:
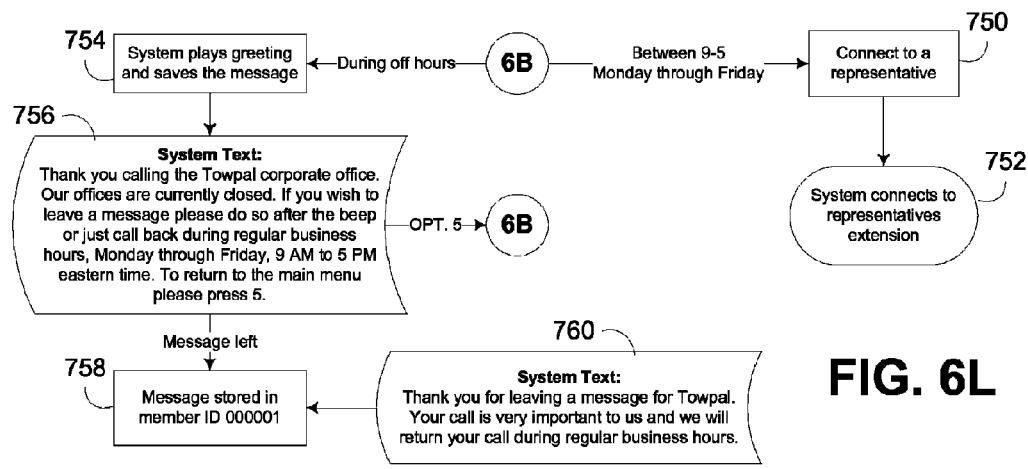
Figure 6K:
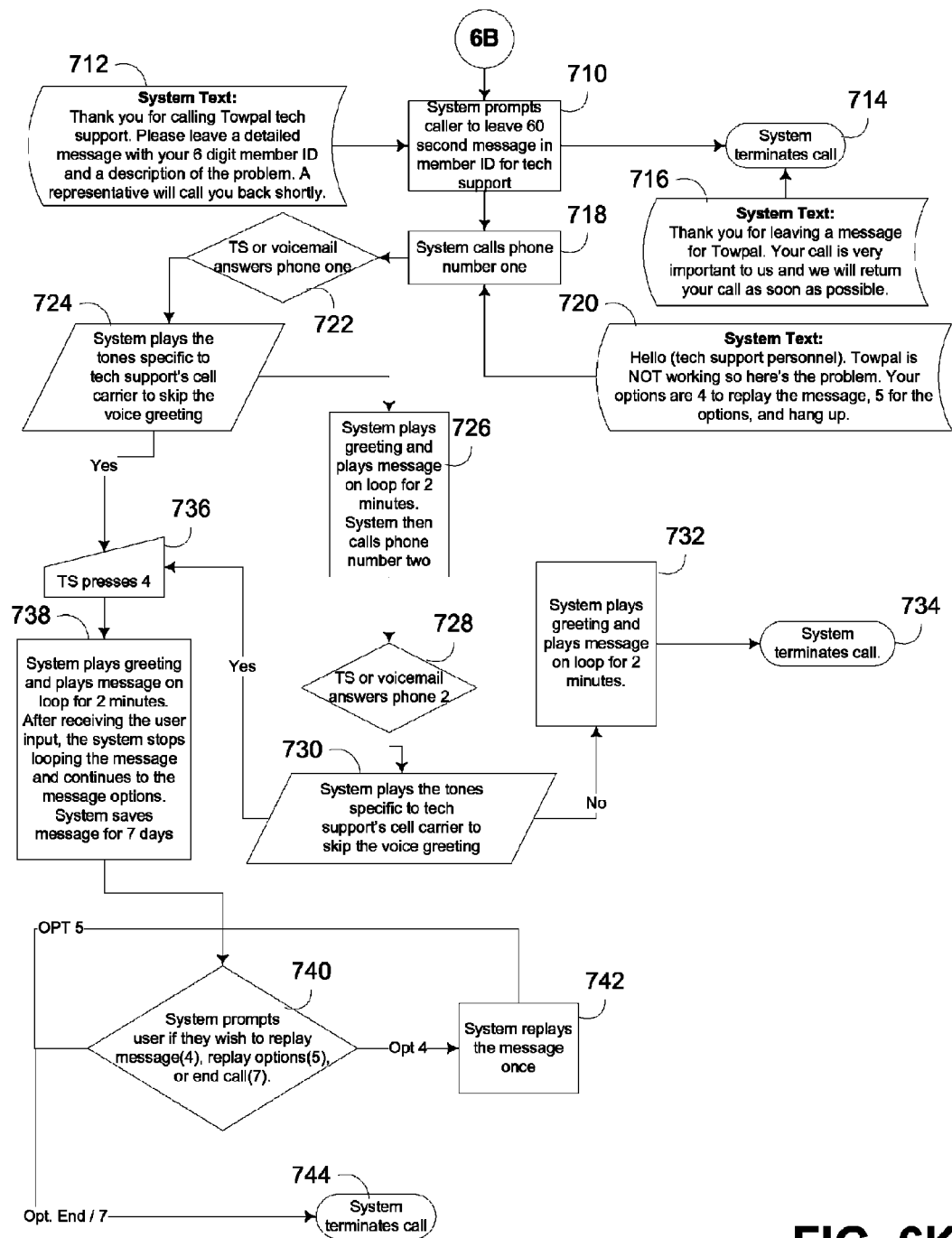

FIG. 6K next illustrates the flow of a call to tech support. In the illustrated implementation, tech support is handled by effectively setting up one or more technical support personnel or users as members in the system, then routing technical support issues from members to technical support personnel in much the same manner as alerts are routed to members. Thus, in the illustrated implementation, records are maintained for technical support personnel including one or more telephone numbers at which such personnel may be reached, and a member call routed to technical support results in a message being recorded by the member and automatically pushed to one or more telephone numbers associated with customer support.

Thus, the tech support process begins in block 710 by prompting the caller with the message in block 712 to leave a message to the mailbox assigned to technical support. The system then terminates the call in block 714, playing the message in block 716. Next, control passes to block 718 to call the primary phone number for a technical support user, and playing the text in block 720. Upon the technical support user or his or her voice mail picking up in block 722, the system plays the tones specific to skipping the voice greeting in block 724, then plays the greeting and member's message on a two minute loop in block 726. The system then calls the secondary number and awaits a pick up in block 728. Upon pick up of the call, the system plays the greeting disable tones in block 730 and plays the greeting and member's message on a loop for two minutes in block 732, ending with terminating the call in block 734.

If at any time the technical support user confirms receipt of the message, play back is halted and control passes to block 736. Block 738 plays the message on a loop, and passes control to block 740 to prompt the technical support user with options to replay the message, replay the options, or end the call. If replay message is selected control passes to block 742 to replay the message. If the end call option is selected, control passes to block 744 to terminate the call.

FIG. 6L next illustrates the contact corporate office flow. Depending upon whether the call is during business hours, one of two paths is taken. If during business hours, control passes to block 750 to contact a customer representative and connect to their extension (block 752). If outside business hours, block 754 plays a greeting in block 756, allowing the user to return to the main menu or leave a message. If a message is left, the message is stored in a general mailbox in block 758, and a thank you is communicated to the caller in block 760.

Figure 7:
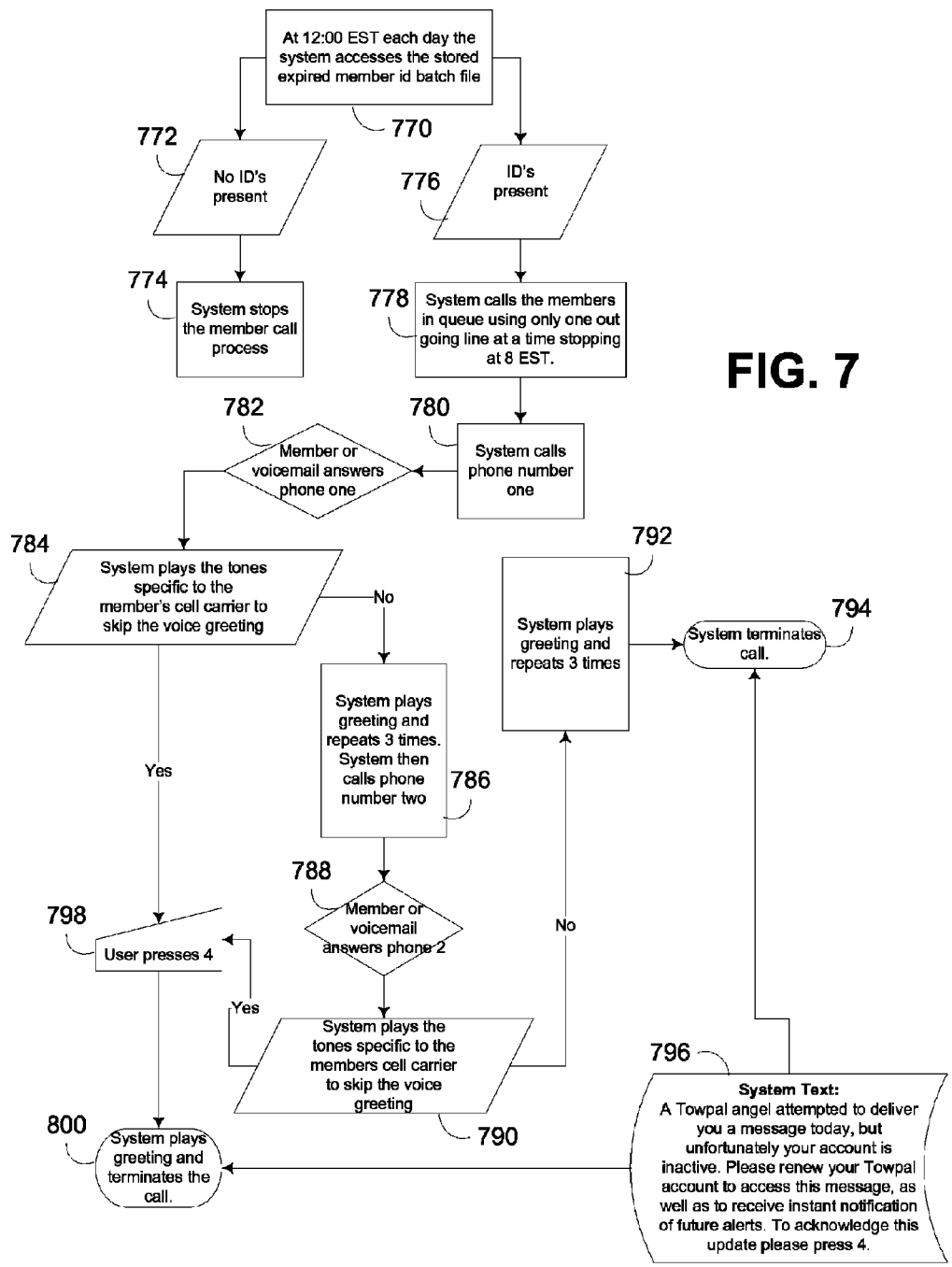
FIG. 7 illustrates a flowchart showing the sequence of operations performed by the system of FIG. 3 when performing a batch expired member notification process.

FIG. 7 next illustrates an expired member notification process that may be performed by the system once a day (or some other periodic basis) to alert members with expired accounts of alerts that have been received from angels (which are added to a queue in block 224 of FIG. 4D and block 332 of FIG. 5B). Block 770 accesses the queue (a stored expired member identifier batch file) at the beginning of each day, and if no identifiers are in the queue (block 772), the process is stopped in block 774. Otherwise, if identifiers are present in the queue (block 776), the system calls members in the queue in block 778. For each expired member, the system calls the primary number for that member in block 780, awaiting the call to be picked up in block 782. The system also plays the greeting disable tones in block 784, and then in block 786 plays a greeting (shown in block 796) alerting the member of the fact that an angel left a message and encouraging the member to bring their account current (e.g., update their billing information or renew their subscription). The system then calls the secondary number for the member, awaits the call to be picked up in block 788 and plays the greeting disable tones in block 790 before repeating the greeting in block 792 and thereafter terminating the call in block 794. If at any time the member confirms receipt of the message, control passes to block 798 to stop playback and terminate the call in block 800.

Figure 8:
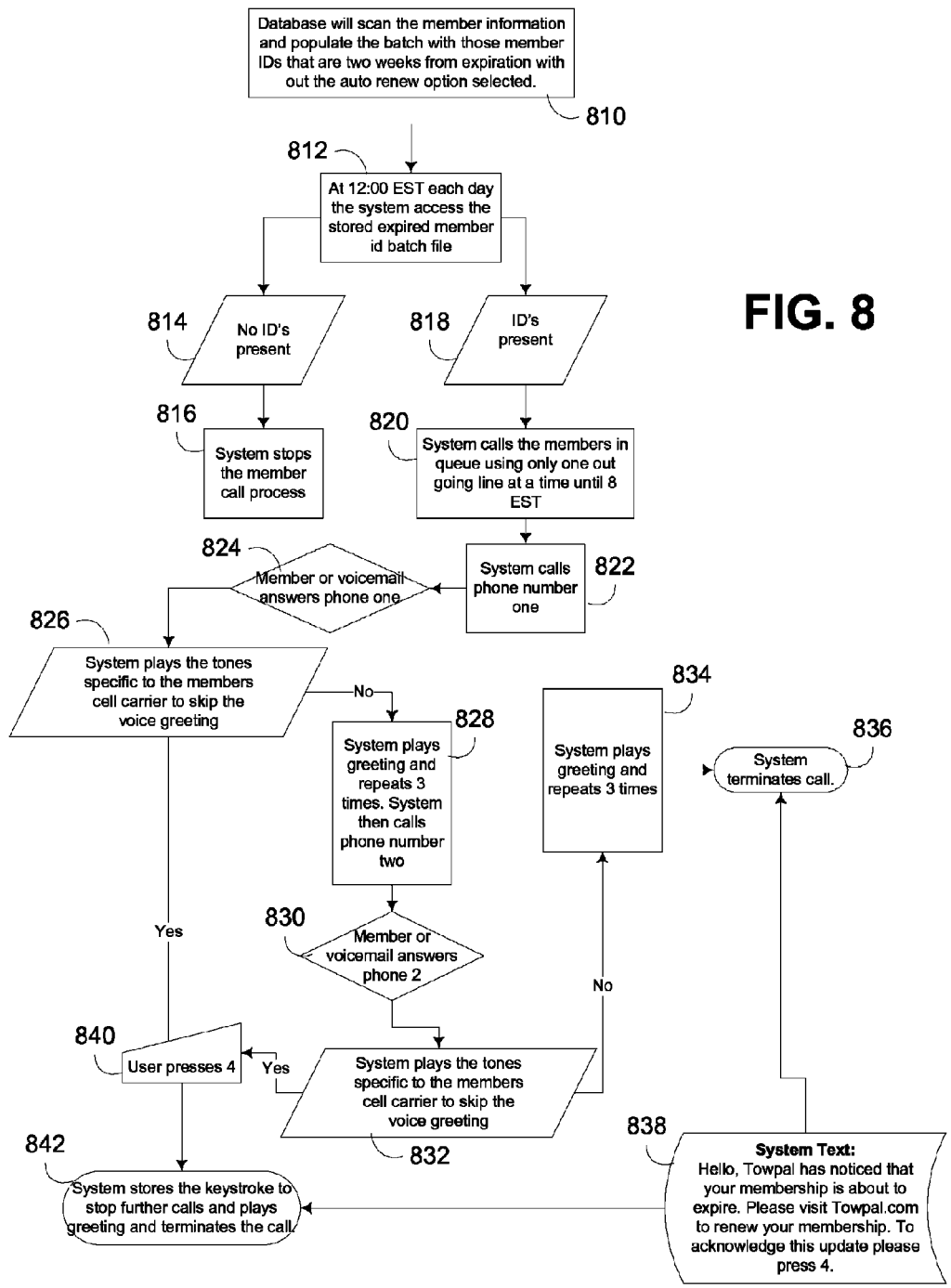
FIG. 8 illustrates a flowchart showing the sequence of operations performed by the system of FIG. 3 when performing a batch expiration warning member notification process.

It may also be desirable in some embodiments to warn members of upcoming expirations. FIG. 8 for example illustrates an expiration warning member notification process that may be performed by the system once a day (or some other periodic basis) to alert members with accounts that may be expiring in the near future. In the process, block 810 accesses the database to scan for members with soon to be expired memberships to populate a queue, e.g., all members with accounts expiring in two weeks without any auto renew option selected. Block 812 then accesses the queue (a stored expired member identifier batch file), and if no identifiers are in the queue (block 814), the process is stopped in block 816. Otherwise, if identifiers are present in the queue (block 818), the system calls members in the queue in block 820. For each member in the queue, the system calls the primary number for that member in block 822, awaiting the call to be picked up in block 824. The system also plays the greeting disable tones in block 826, and then in block 828 plays a greeting (shown in block 838) alerting the member of the fact that the membership is about to expire. The system then calls the secondary number for the member, awaits the call to be picked up in block 830 and plays the greeting disable tones in block 832 before repeating the greeting in block 834 and thereafter terminating the call in block 836. If at any time the member confirms receipt of the message, control passes to block 840 to stop playback and terminate the call in block 842.

The manner in which a member may join the service may vary in different embodiments. Memberships may be created over the phone, e.g., by contacting customer service from the service main number. In other embodiments, it may be desirable to associate a web site with the service to enable members to create accounts, manage their accounts, change billing information, and otherwise perform any of the service changes that are performed via the automated and interactive telephone system discussed above. In addition, members may be permitted to listen to alerts or view transcripts of alerts, and otherwise manage the messages they receive from angels. An auto-delete function may be provided to automatically delete alerts after a predetermined time period (e.g., seven days). In addition, members may be permitted to set up automatic renewal of their subscriptions, e.g., so a credit card is billed automatically to renew a subscription for another period (e.g., month-to-month, year-to-year, etc.).

Figure 9:
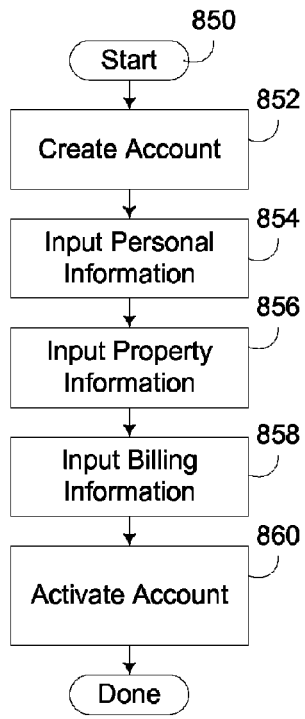
FIG. 9 illustrates a flowchart showing the sequence of operations performed by the system of FIG. 3 when creating a new member account.

FIG. 9, for example, illustrates a process 850 for creating a new member account via a service web site. A member may create an account, for example, by requesting to create the account in block 852 (e.g., by selecting a user name and password), inputting personal information in block 854 (e.g., name, address, primary and secondary telephone numbers, email address, sex, age, separate billing/shipping addresses, etc.), inputting property information in block 856 (e.g., type of property, property name, desired sign type, desired types of notification such as voice, email, text, etc.) and inputting billing information in block 858 (e.g., credit card information, type of membership requested, selection of auto renew option, etc.). Then, upon entry of proper data, the system may activate the account in block 860, charging the member's credit card and creating a database record for the member. Activation of the account may also trigger addition activities, e.g., sending signs to the member, sending confirmatory emails to the member, etc.

Figure 10:
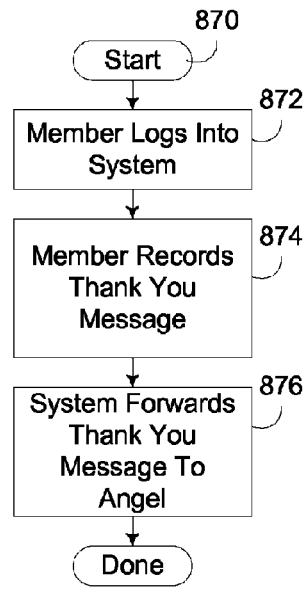
FIG. 10 illustrates a flowchart showing the sequence of operations performed by the system of FIG. 3 when sending a thank you to an angel user.

It may also be desirable in some embodiments to provide additional features via the automated and interactive telephone system and/or an associated web site. For example, as shown by process 870 of FIG. 10, it may be desirable to perform a member to send a thank you message to an angel. Process 870 begins in block 872 by logging the member into the system, either via the telephone system or via the web site, and once logged in, allowing the member to record a thank you message in block 874. The system then forwards that message to the angel's telephone number using the stored caller ID in block 876. Of note, so long as the member does not provide any identifying information, the member can thank the angel while remaining anonymous. Moreover, the member is typically not allowed to access the caller ID of the angel, so the angel remains anonymous to the member as well.

Figure 11:
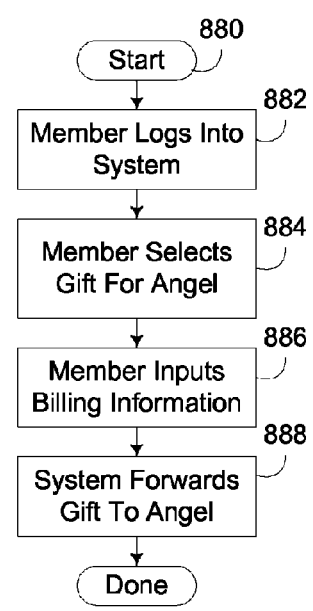
FIG. 11 illustrates a flowchart showing the sequence of operations performed by the system of FIG. 3 when sending a gift to an angel user.

It may also be desirable to enable a member to express their gratitude to an angel further by providing the angel with a gift as a show of appreciation. FIG. 11, for example, illustrates a process 880 for sending a gift to an angel. A member logs into the system in block 882 (via telephone or via the web site) and the member selects a gift for the angel in block 884. The member then inputs billing information in block 886, or alternatively, may simply authorize the purchase to be applied to the credit card associated with the member's account. The system then forwards the gift to the angel in block 888. Of note, it may be necessary in some instances for the system or personnel to contact the angel via the stored caller ID information to receive shipping information from the angel, prior to sending the gift. Voice recognition technology may be used, for example, to determine shipping information from an automated call to an angel. Nonetheless, it is still desirable to inhibit the angel's identifying information from being viewed by the member.

It will also be appreciated that in some instances various steps in sending a thank you or gift to an angel may be performed with human assistance from customer service representatives.

Figure 12:
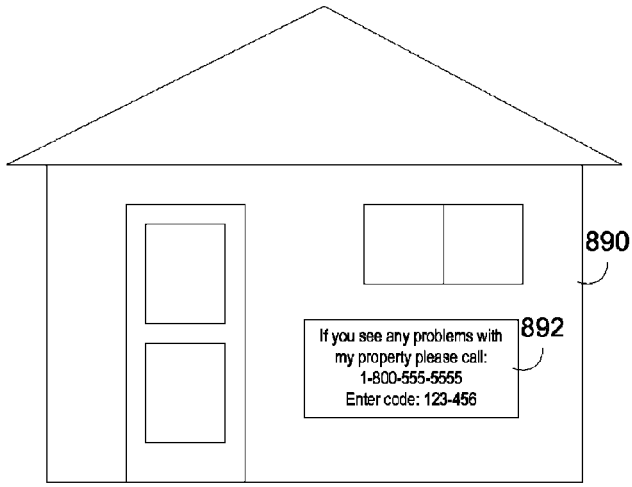
FIG. 12 is a front elevation view of a vacation property incorporating a sign suitable for use in connection with a hazardous condition alert system and process consistent with the invention.

In addition, as noted above, a hazardous condition alert system consistent with the invention may be used in connection with property other than vehicular-type property. FIG. 12, for example, illustrates a vacation property 890 incorporating a sign 892 suitable for use in connection with a hazardous condition alert system and process consistent with the invention.

Various modifications may be made to the illustrated embodiments without departing from the spirit and scope of the invention. For example, a member can additionally be alerted via direct communication with the member's vehicle, e.g., if the member's vehicle has an Internet or other telecommunications connection. As one example, an application running on a dashboard display could receive notification of an alert and display a warning message, or even display a text message or play back a voice message. Alerts may also be routed to various additional devices, e.g., personal navigators. In addition, an application may be provided for mobile devices to enable members to receive alerts and/or manage their accounts.

In addition, the system disclosed herein may be used in connection with selling real or personal property (e.g., a house or car). A sign or other display may be placed in proximity to property with a telephone number and property identifier, with a message directing buyers to call the number and enter the identifier for more information about the property. A potential buyer may then call the telephone number, enter the identifier and then listen to a recorded message with information about the property. The potential buyer would then have the option of leaving a message for the seller, potentially including contact information for the buyer. The system would then automatically forward the message to the seller in the manner disclosed herein, enabling the seller to quickly receive the message from the buyer. Moreover, the seller's telephone number is not provided to the buyer, so the seller can maintain anonymity if so desired.

Furthermore, the system disclosed herein may be used in connection with providing technical support for organizations (e.g., businesses) other than those providing hazardous condition alert services, e.g., in the manner discussed above in connection with FIG. 6K. In such instances, a call by a customer to technical support, e.g., through either a direct number or through a general number from which a user selects to leave a message for technical support, results in the customer leaving a message for technical support describing the issue. The customer may also input a customer-specific identifier, or the system may use caller ID information from the call to identify the customer. The system then automatically calls a telephone number associated with a technical support user and plays back the message during the telephone call, in much the same manner as a member receives an alert using the system described above. The technical support user then would have the option of calling the customer back, or alternatively generating a response message (potentially including the solution to the issue) that is returned to the customer in the same manner as an alert is forwarded to a member. The system may also report the identity of the customer to the technical support user, e.g., when playing back the message and any timestamp associated with the message.

It will be appreciated that multiple telephone numbers may be associated with technical support such that the telephone numbers can be dialed sequentially and repeatedly until a confirmation is received, in much the same manner that alerts are reported to members, thus ensuring technical support receives every issue on a timely basis. In addition, it will be appreciated that multiple technical support mailboxes may be supported, e.g., so that issues directed to particular topics, product lines, or customers can be routed to different technical support personnel. Furthermore, the telephone numbers associated with technical support may be changed frequently, e.g., to permit different technical support personnel to be "on-call" at different times. It may be desirable, for example, to enable technical support personnel to update their profiles in a similar manner to updating profiles for members.

The herein-described technical support system may have particular benefit for smaller organizations and/or organizations that receive a relatively low volume of technical support issues, which may not be able to justify a 24/7 staffed phone center to provide technical support. Through the use of the aforementioned system, technical support personnel may be on-call, but not required to be physically located at the organization while on-call (e.g., if their home and/or mobile telephone numbers are assigned to receive pushed messages), while being able to receive technical support issues and respond to those issues in a relatively prompt manner.

Other modifications will be apparent to one of ordinary skill in the art. Therefore, the invention lies in the claims hereinafter appended.

What is claimed is:

1. A computerized method of reporting a hazardous towing condition, the method comprising, in response to a first telephone call placed to a first telephone number by a first user from a second telephone number that has viewed a hazardous condition associated with a vehicle being towed by a member:
receiving from the first user during the first telephone call an identifier displayed on a sign affixed to the vehicle, wherein the sign additionally displays the first telephone number and an instruction to call the first telephone number in the event of a hazardous towing condition;
using the identifier to retrieve a second user information associated with the member from a computer database, wherein the second user information includes a third telephone number associated with the member and a vehicle identifier associated with the vehicle;
prompting the first user to leave a voice message using a prompt that includes the vehicle identifier associated with the vehicle;
receiving a voice message from the first user during the first telephone call that describes the hazardous towing condition;
electronically storing the voice message;
automatically placing a second telephone call to the third telephone number retrieved from the computer database in response to receiving the voice message;
playing the electronically stored voice message to the member during the second telephone call to alert the member of the hazardous towing condition; and
inhibiting access to the second telephone number by the member and inhibiting access to the third telephone number by the first user to maintain anonymity for each of the first user and the member.

2. A computerized method of reporting a hazardous condition, the method comprising, in response to a first telephone call placed from a third telephone number to a first telephone number by a first user that has viewed a hazardous condition associated with property of a second user:
receiving from the first user during the first telephone call an identifier displayed proximate to the property;
using the identifier to retrieve user information associated with the second user from a computer database, wherein the user information includes a second telephone number associated with the second user;
receiving a voice message from the first user during the first telephone call that describes the hazardous condition;
electronically storing the voice message;
automatically pushing the electronically stored voice message to the second user by placing a second telephone call to the second telephone number retrieved from the computer database and playing the electronically stored voice message during the second telephone call to alert the second user of the hazardous condition, and
inhibiting access to the third telephone number by the second user and inhibiting access to the second telephone number by the first user to maintain anonymity for each of the first user and the second user.

3. The method of claim 2, wherein the user information includes a property identifier, the method further comprising prompting the first user to leave a voice message using a prompt that includes the property identifier associated with the property.

4. The method of claim 3, wherein the property is a vehicle, wherein the property identifier identifies a type of the vehicle, and wherein the prompt identifies the type of the vehicle.

5. The method of claim 2, wherein the property is selected from the group consisting of a horse trailer, a travel trailer, a pop-up camper, a generic trailer, a vehicle on a tow dolly, an SUV in flat tow, a truck in flat tow, and a car in flat tow.

6. The method of claim 2, wherein the property includes real property.

7. The method of claim 2, further comprising generating greeting disable tones to disable a voicemail greeting during the second telephone call.

8. The method of claim 2, further comprising determining whether the third telephone number from which the first user placed the first telephone call has been blocked by the second user, wherein automatically pushing the electronically stored voice message to the second user is performed only if the third telephone number has not been blocked by the second user.

9. The method of claim 8, further comprising blocking the third telephone number in response to input from the second user subsequent to receiving a prior voice message from the first user.

10. The method of claim 2, further comprising determining whether the third telephone number from which the first user placed the first telephone call is known, wherein automatically pushing the electronically stored voice message to the second user is performed only if the third telephone number is known.

11. The method of claim 10, further comprising blocking voice messages from unknown callers in response to input from the second user.

12. The method of claim 2, further comprising placing a third telephone call to a fourth telephone number retrieved from the computer database and associated with the second user and playing the electronically stored voice message during the third telephone call.

13. The method of claim 12, wherein placing the third telephone call is performed only in response to failing to receive a confirmation from the second user during the second telephone call.

14. The method of claim 2, further comprising placing a third telephone call to the second telephone number and playing the electronically stored voice message during the third telephone call in response to failing to receive a confirmation from the second user during the second telephone call.

15. The method of claim 2, further comprising disabling notification of the second user in response to user input from the second user to disable notifications, wherein automatically pushing the electronically stored voice message to the second user is delayed until notifications have been reenabled for the second user, the method further comprising determining whether notifications have been disabled prior to automatically pushing the electronically stored voice message to the second user.

16. The method of claim 15, wherein the user input received from the second user includes a sleep period, the method further comprising automatically re-enabling notifications for the second user after expiration of the sleep period.

17. The method of claim 2, further comprising forwarding a non-voice notification to the second user via a medium other than a telephone call.

18. The method of claim 2, wherein the second user is a member having a subscription, the method further comprising batch calling each of a plurality of members for which subscriptions therefor will expire during a given time period to remind such members of expiration of such subscriptions.

19. The method of claim 2, wherein automatically pushing the electronically stored voice message to the second user is performed only if a subscription for the second user is not expired, the method further comprising calling the second user in response to receiving the first telephone call without playing the electronically stored voice message to alert the second user that the electronically stored voice message has been left and that the subscription for the second user is expired.

20. The method of claim 2, further comprising calling the second telephone number and playing a message to the second user in response to a change to the user information for the second user, wherein the message confirms the changes to the user information.

21. The method of claim 2, further comprising, in response to user input from the second user, recording a thank you voice message for the second user, placing a third telephone call to the third telephone number that was used by the first user to place the first telephone call, and playing the thank you voice message during the third telephone call to thank the first user.

22. The method of claim 2, further comprising, in response to user input from the second user, sending a gift to the first user as a thank you, including charging the second user for the gift.

23. An apparatus, comprising:
at least one processor; and
program code configured to be executed by the at least one processor to report a hazardous condition in response to a first telephone call placed from a third telephone number to a first telephone number by a first user that has viewed a hazardous condition associated with property of a second user, the program code configured to receive from the first user during the first telephone call an identifier displayed proximate to the property, use the identifier to retrieve user information associated with the second user from a computer database, wherein the user information includes a second telephone number associated with the second user, receive a voice message from the first user during the first telephone call that describes the hazardous condition, electronically store the voice message, automatically push the electronically stored voice message to the second user by placing a second telephone call to the second telephone number retrieved from the computer database and playing the electronically stored voice message during the second telephone call to alert the second user of the hazardous condition, and inhibit access to the third telephone number by the second user and inhibit access to the second telephone number by the first user to maintain anonymity for each of the first user and the second user.

24. The apparatus of claim 23, wherein the user information includes a property identifier, and wherein the program code is configured to prompt the first user to leave a voice message using a prompt that includes the property identifier associated with the property.

25. The apparatus of claim 23, wherein the program code is configured to determine whether the third telephone number from which the first user placed the first telephone call has been blocked by the second user, and automatically push the electronically stored voice message to the second user only if the third telephone number has not been blocked by the second user.

26. The apparatus of claim 23, wherein the program code is configured to determine whether the third telephone number from which the first user placed the first telephone call is known, and automatically push the electronically stored voice message to the second user only if the third telephone number is known.

27. The apparatus of claim 23, wherein the program code is configured to place a third telephone call to a fourth telephone number retrieved from the computer database and associated with the second user and play the electronically stored voice message during the third telephone call in response to failing to receive a confirmation from the second user during the second telephone call.

28. The apparatus of claim 23, wherein the program code is configured to disable notification of the second user in response to user input from the second user to disable notifications, and delay automatically pushing the electronically stored voice message to the second user until notifications have been reenabled for the second user.

29. The apparatus of claim 28, wherein the user input received from the second user includes a sleep period, and wherein the program code is configured to automatically reenable notifications for the second user after expiration of the sleep period.

30. The apparatus of claim 23, wherein the second user is a member having a subscription, and wherein the program code is configured to batch call each of a plurality of members for which subscriptions therefor will expire during a given time period to remind such members of expiration of such subscriptions.

31. The apparatus of claim 23, wherein the program code is configured to automatically push the electronically stored voice message to the second user only if a subscription for the second user is not expired, and call the second user in response to receiving the first telephone call without playing the electronically stored voice message to alert the second user that the electronically stored voice message has been left and that the subscription for the second user is expired.

32. The apparatus of claim 23, wherein the program code is configured to call the second telephone number and play a message to the second user in response to a change to the user information for the second user, wherein the message confirms the changes to the user information.

33. The apparatus of claim 23, wherein the program code is configured to, in response to user input from the second user, record a thank you voice message for the second user, place a third telephone call to the third telephone number that was used by the first user to place the first telephone call, and play the thank you voice message during the third telephone call to thank the first user.

34. The apparatus of claim 23, wherein the program code is configured to, in response to user input from the second user, initiate sending of a gift to the first user as a thank you, and charge the second user for the gift.

35. A program product, comprising:
a non-transitory computer readable storage medium; and
program code stored on the computer readable storage medium and configured upon execution to report a hazardous condition in response to a first telephone call placed from a third telephone number to a first telephone number by a first user that has viewed a hazardous condition associated with property of a second user, the program code configured to receive from the first user during the first telephone call an identifier displayed proximate to the property, use the identifier to retrieve user information associated with the second user from a computer database, wherein the user information includes a second telephone number associated with the second user, receive a voice message from the first user during the first telephone call that describes the hazardous condition, electronically store the voice message, automatically push the electronically stored voice message to the second user by placing a second telephone call to the second telephone number retrieved from the computer database and playing the electronically stored voice message during the second telephone call to alert the second user of the hazardous condition, and inhibit access to the third telephone number by the second user and inhibit access to the second telephone number by the first user to maintain anonymity for each of the first user and the second user.

* * * * *